United States Patent
Ohtsuka et al.

(10) Patent No.: US 8,649,023 B2
(45) Date of Patent: Feb. 11, 2014

(54) FILM THICKNESS MEASUREMENT DEVICE AND MEASUREMENT METHOD

(75) Inventors: Kenichi Ohtsuka, Hamamatsu (JP); Tetsuhisa Nakano, Hamamatsu (JP); Motoyuki Watanabe, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 126 days.

(21) Appl. No.: 13/201,976

(22) PCT Filed: Jan. 20, 2010

(86) PCT No.: PCT/JP2010/050634
§ 371 (c)(1),
(2), (4) Date: Aug. 17, 2011

(87) PCT Pub. No.: WO2010/109933
PCT Pub. Date: Sep. 30, 2010

(65) Prior Publication Data
US 2011/0299097 A1 Dec. 8, 2011

(30) Foreign Application Priority Data
Mar. 27, 2009 (JP) ................................. 2009-078772

(51) Int. Cl.
G01B 11/02 (2006.01)
(52) U.S. Cl.
USPC ........................................................ 356/503
(58) Field of Classification Search
USPC .................... 356/503, 504, 630, 632, 486
See application file for complete search history.

(56) References Cited

U.S. PATENT DOCUMENTS

| 4,293,224 A * | 10/1981 | Gaston et al. | 356/504 |
| 5,619,329 A * | 4/1997 | Otani | 356/632 |
| 2004/0227955 A1 * | 11/2004 | Kudou et al. | 356/504 |

FOREIGN PATENT DOCUMENTS

| CN | 1664493 | 9/2005 |
| CN | 101261116 | 9/2008 |
| CN | 101294795 | 10/2008 |
| JP | S55-075605 | 6/1980 |
| JP | 63-50703 | 3/1988 |
| JP | 63-122906 | 5/1988 |
| JP | 6-252113 | 9/1994 |
| JP | 2612089 | 2/1997 |
| JP | 2656869 | 5/1997 |
| JP | 11-14312 | 1/1999 |
| JP | 11-132726 | 5/1999 |
| JP | 2002-181514 | 6/2002 |

(Continued)

*Primary Examiner* — Gregory J Toatley
*Assistant Examiner* — Shawn Decenzo
(74) *Attorney, Agent, or Firm* — Drinker Biddle & Reath LLP

(57) ABSTRACT

A film thickness measurement apparatus includes a measurement light source that supplies measurement light containing a measurement light component with a first wavelength and a measurement light component with a second wavelength to a measuring object, a spectroscopic optical system that decomposes interfering light of reflected light from the upper surface and reflected light from the lower surface of the measuring object into an interfering light component with the first wavelength and an interfering light component with the second wavelength, photodetectors that detect intensities of the first and second interfering light components at each time point, and a film thickness analysis section that obtains a temporal change in film thickness of the measuring object based on a phase difference between a first phase in a temporal change in detected intensity of the first interfering light component and a second phase in a temporal change in detected intensity of the second interfering light component.

12 Claims, 18 Drawing Sheets

(56) References Cited

FOREIGN PATENT DOCUMENTS

| JP | 3491337 | 11/2003 |
| JP | 2005-84019 | 3/2005 |
| JP | 2010-230515 | 10/2010 |
| WO | WO 03/027609 | 4/2003 |

* cited by examiner

Fig.2
(a)
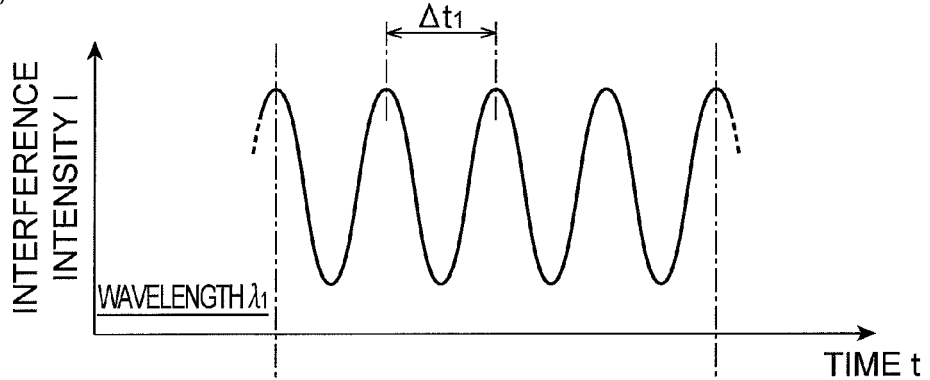
(b)
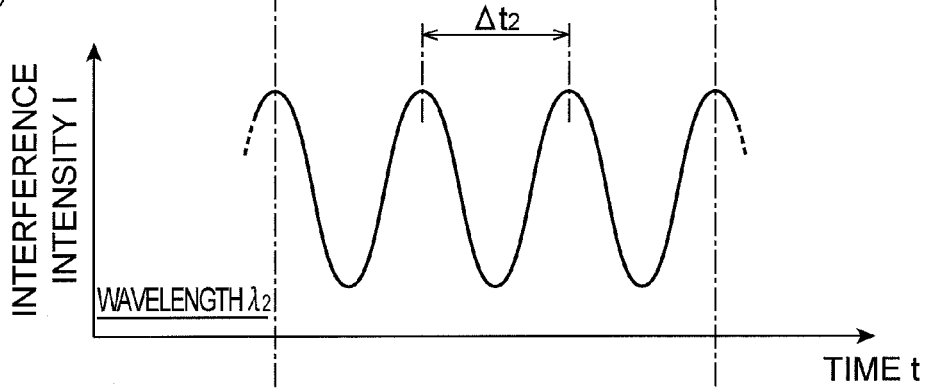
(c)
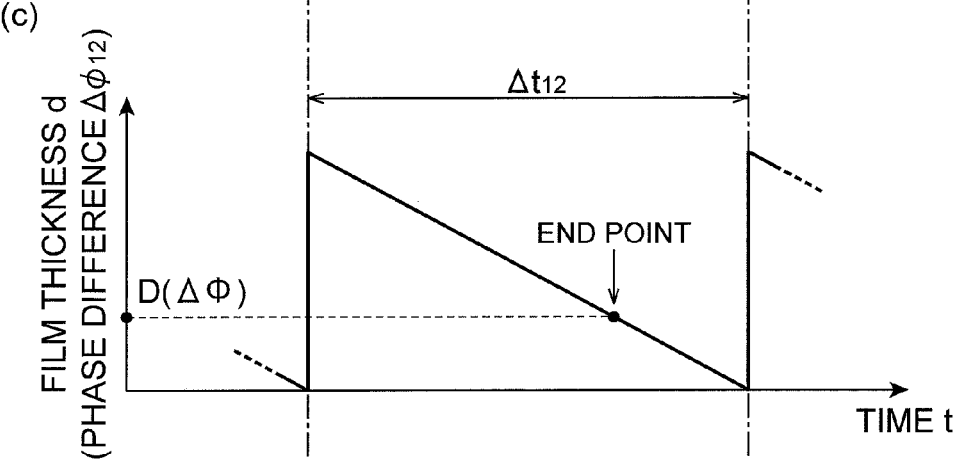

Fig.9
(a) 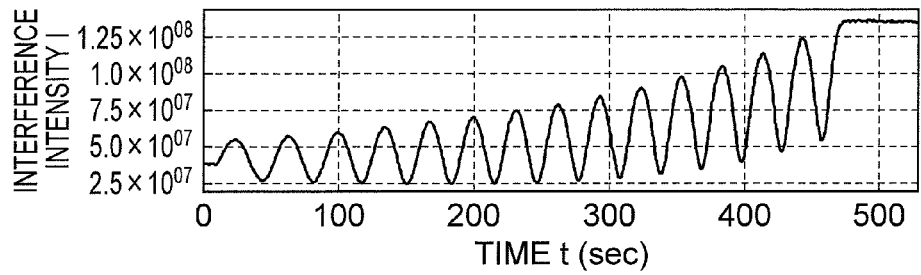
(b) 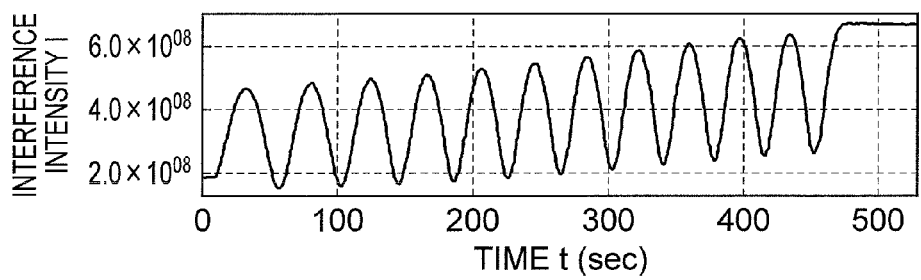
(c) 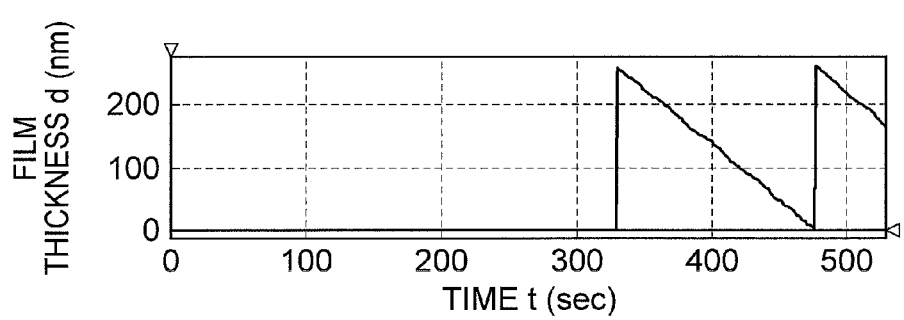
(d) 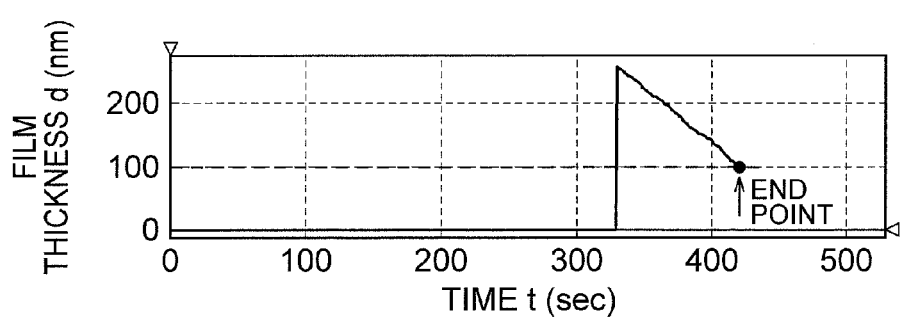

Fig.11
(a) 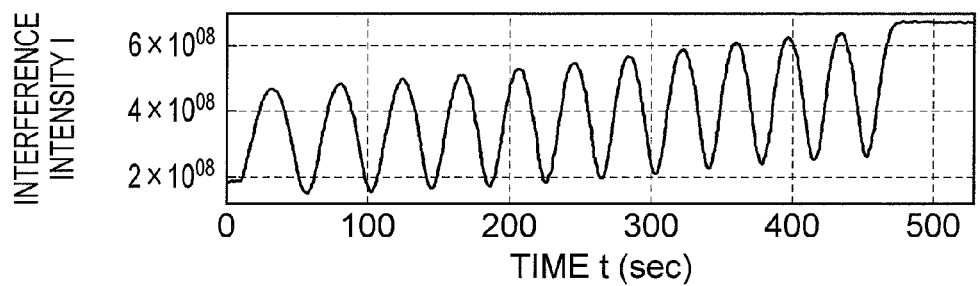
(b) 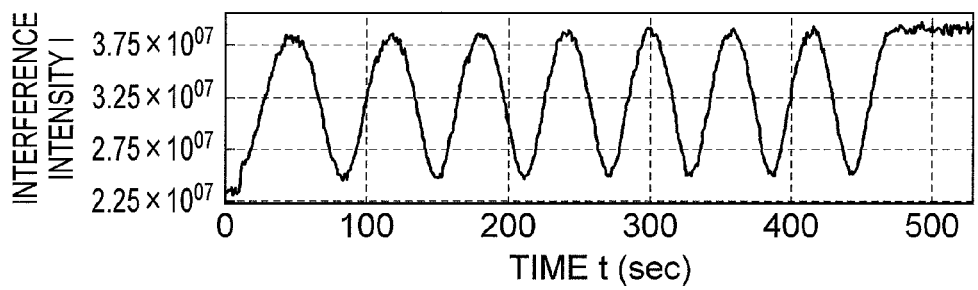
(c) 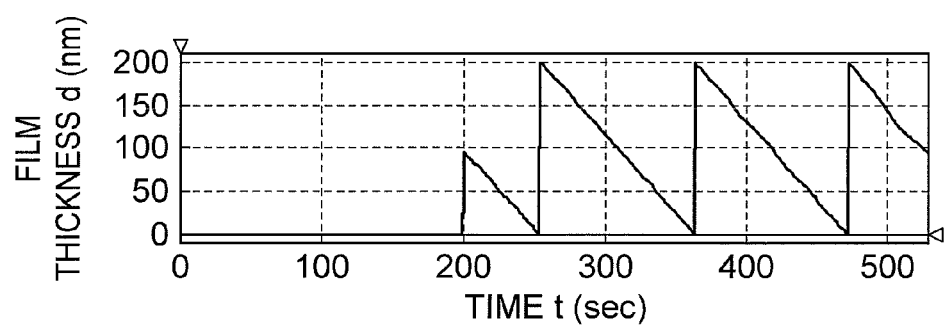

*Fig.14*
(a)
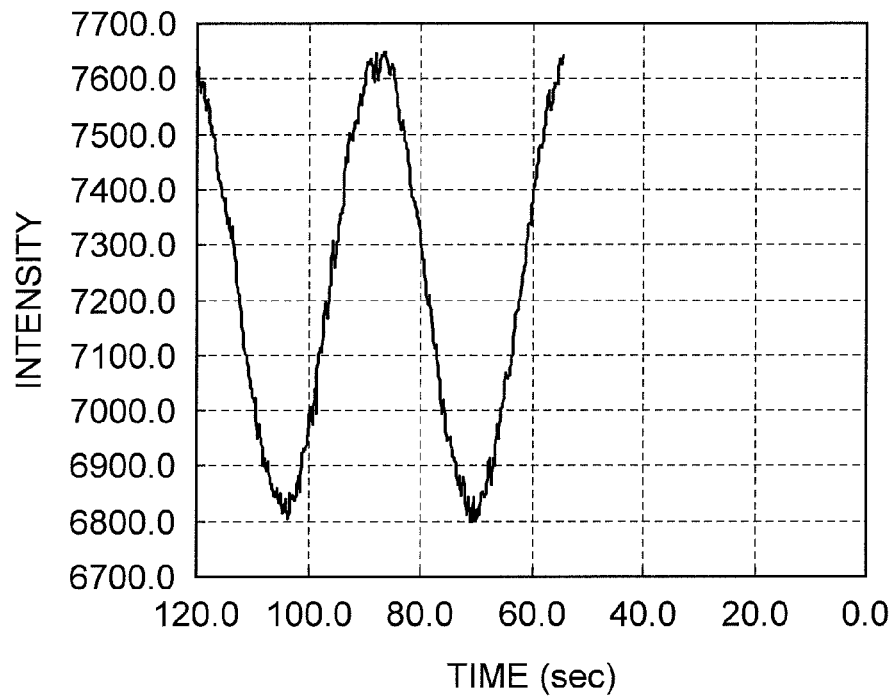
(b)
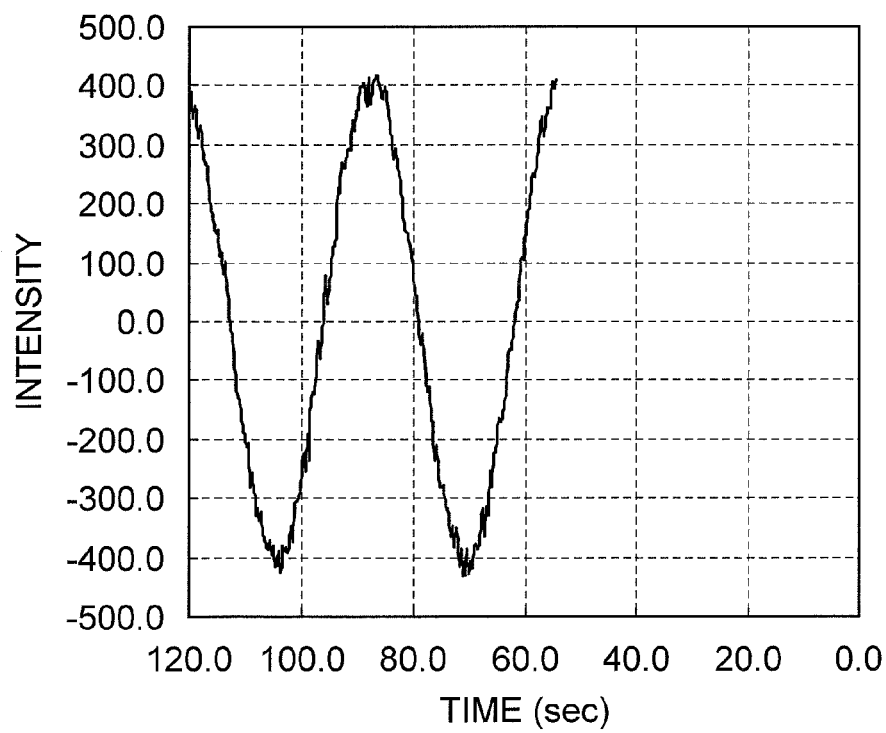

*Fig.15*
(a)
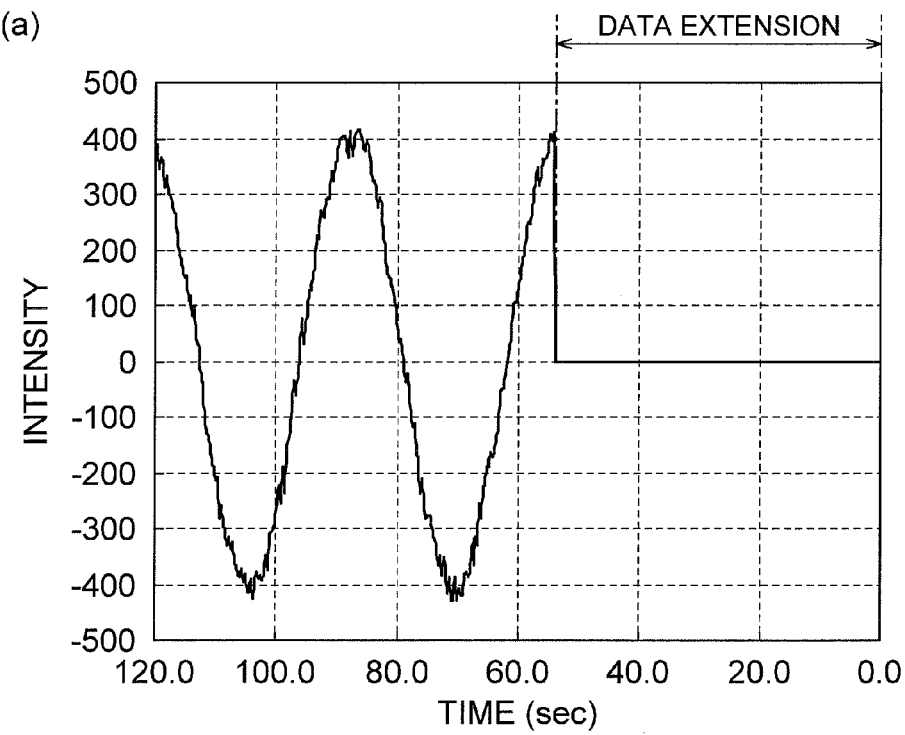
(b)
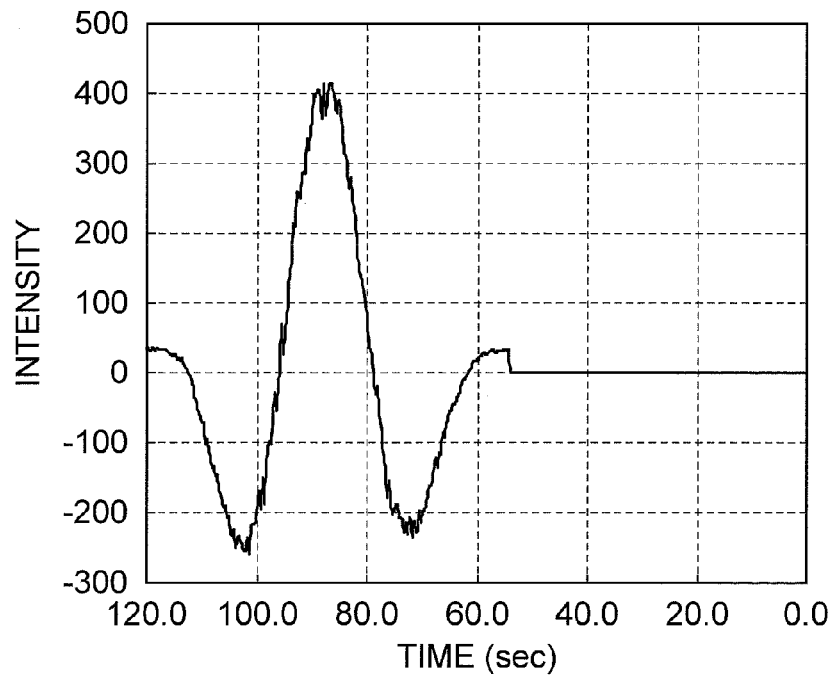

FILM THICKNESS MEASUREMENT DEVICE AND MEASUREMENT METHOD

TECHNICAL FIELD

The present invention relates to a film thickness measurement apparatus and a film thickness measurement method for measuring a temporal change in film thickness of a film-shaped measuring object such as a semiconductor film formed on a substrate.

BACKGROUND ART

In a semiconductor manufacturing process, for example, during execution of an etching process, a film thickness of a semiconductor film on a substrate changes with time to decrease. During execution of a thin-film formation process, a film thickness of a semiconductor film changes with time to increase. In such a semiconductor process, for process control such as detection of an end point of the process, etc., in-situ measurement of a temporal change in film thickness of the semiconductor film is necessary.

As such a measurement method for the film thickness of a semiconductor film, there is used a method in which a semiconductor film is irradiated with measurement light with a predetermined wavelength, and interfering light generated by interference of reflected light from the upper surface and reflected light from the lower surface of the semiconductor film is detected. In this method, when the film thickness of the semiconductor film changes, an optical path length difference between the reflected light from the upper surface and the reflected light from the lower surface changes. Therefore, by utilizing a temporal change in detected intensity (interference intensity) of the interfering light corresponding to the change in optical path length difference, film thicknesses of the semiconductor film at each time point can be measured (for example, refer to Patent Documents 1 to 4).

CITATION LIST

Patent Literature

Patent Document 1: Japanese Patent Publication No. 2612089
Patent Document 2: Japanese Patent Publication No. 2656869
Patent Document 3: Japanese Patent Publication No. 3491337
Patent Document 4: Japanese Patent Application Laid-Open No. S63-50703

SUMMARY OF INVENTION

Technical Problem

In the above-described measurement of a temporal change in film thickness of a semiconductor film, for an improvement, etc., in control accuracy of the semiconductor manufacturing process, a further improvement in measurement accuracy of the film thickness, more specifically, an improvement in measurement accuracy of the absolute value of the film thickness has been demanded. However, in conventional measurement methods, sufficient film thickness measurement accuracy may not be obtained.

For example, in the method described in Patent Document 1, as described above, interfering light generated by interference of reflected light from the upper surface and reflected light from the lower surface is detected, and from a temporal change in detected interference intensity, the film thickness is calculated. However, this method is based on the assumption that a periodic change in interference intensity is accurately detected, and for example, when a time point at which a periodic change in light intensity first becomes maximum is unclear, the value of the film thickness at a reference time point becomes inaccurate, so that it is difficult to accurately measure a temporal change in absolute value of the film thickness.

Patent Document 2 discloses a method in which an end point of etching is detected by using a signal obtained by summing absolute values of temporal differentiation of light intensities of two wavelengths in reflected light from a semiconductor film. Patent Document 3 discloses a method in which reflected light or transmitted light from a semiconductor film is detected by irradiating the semiconductor film with a light beam from a wavelength variable laser, and from a waveform of a light intensity change with respect to a wavelength obtained by changing the wavelength, the film thickness is obtained. Patent Document 4 discloses a method in which reflected light or transmitted light from the semiconductor film is dispersed and detected, and by using a maximum value and a minimum value of an output of each wavelength, the film thickness is obtained. However, even by using these methods, it is difficult to accurately measure a temporal change in absolute value of the film thickness. This problem also occurs in measurement of a temporal change in film thickness of a film-shaped measuring object other than a semiconductor film.

The present invention has been made to solve the above-described problem, and an object thereof is to provide a film thickness measurement apparatus and a film thickness measurement method by which a temporal change in film thickness of a film-shaped measuring object can be accurately measured.

Solution to Problem

In order to achieve the above-described object, a film thickness measurement apparatus according to the present invention measures a temporal change in film thickness of a film-shaped measuring object having a first surface and a second surface, and the film thickness measurement apparatus includes: (1) a measurement light source supplying measurement light containing at least a first measurement light component with a first wavelength and a second measurement light component with a second wavelength different from the first wavelength to the measuring object, (2) spectroscopic means decomposing interfering light generated by interference of reflected light from the first surface and reflected light from the second surface of the measuring object of the measurement light into a first interfering light component with the first wavelength and a second interfering light component with the second wavelength to be detectable separately, (3) detection means detecting intensities of the first interfering light component and the second interfering light component respectively at each time point, and (4) film thickness analysis means obtaining a temporal change in film thickness of the measuring object based on a phase difference between a first phase in a temporal change in detected intensity of the first interfering light component and a second phase in a temporal change in detected intensity of the second interfering light component.

Similarly, a film thickness measurement method according to the present invention is for measuring a temporal change in film thickness of a film-shaped measuring object having a first surface and a second surface, and the film thickness measurement method includes: (1) a measurement light supply step of supplying measurement light containing at least a first measurement light component with a first wavelength and a second measurement light component with a second wavelength different from the first wavelength to the measuring object from a measurement light source, (2) a spectroscopic step of decomposing interfering light generated by interference of reflected light from the first surface and reflected light from the second surface of the measuring object of the measurement light into a first interfering light component with the first wavelength and a second interfering light component with the second wavelength to be detectable separately, (3) a detection step of detecting intensities of the first interfering light component and the second interfering light component respectively at each time point, and (4) a film thickness analysis step of obtaining a temporal change in film thickness of the measuring object based on a phase difference between a first phase in a temporal change in detected intensity of the first interfering light component and a second phase in a temporal change in detected intensity of the second interfering light component.

In the above-described film thickness measurement apparatus and measurement method, measurement light containing light components having a first wavelength and a second wavelength is supplied to a film-shaped measuring object, and interfering light of reflected light components from the first surface and the second surface (the upper surface and the lower surface) is detected. Then, a phase difference between a phase in a temporal change in detected intensity of the first interfering light component with the first wavelength and a phase in a temporal change in detected intensity of the second interfering light component with the second wavelength is acquired, and from this phase difference, a temporal change of the film thickness of the measuring object is obtained. With this configuration, it becomes possible to accurately measure an absolute value of the film thickness of a film-like measuring object and a temporal change in the absolute value based on a phase difference between temporal waveforms of the detected intensities of the two wavelengths.

Advantageous Effects of Invention

According to the film thickness measurement apparatus and the film thickness measurement method of the present invention, measurement light containing light components with a first wavelength and a second wavelength is supplied to a measuring object, interfering light of reflected light components from the first surface and the second surface is detected, a phase difference between a phase in a temporal change in detected intensity of the first interfering light component with the first wavelength and a phase in a temporal change in detected intensity of the second interfering light component with the second wavelength is acquired, and from this phase difference, a temporal change in film thickness of the measuring object is obtained, and accordingly, an absolute value of the film thickness of a film-shaped measuring object and a temporal change in the absolute value can be accurately measured.

BRIEF DESCRIPTION OF DRAWINGS

FIG. 2 includes graphs schematically showing a principle of measurement of a temporal change in film thickness of a measuring object.

FIG. 9 includes graphs showing a first measurement example of film thickness measurement.

FIG. 11 includes graphs showing a third measurement example of film thickness measurement.

FIG. 14 includes graphs describing a specific example of analysis processing for film thickness measurement.

FIG. 15 includes graphs describing a specific example of analysis processing for film thickness measurement.

DESCRIPTION OF EMBODIMENTS

Figure 1:
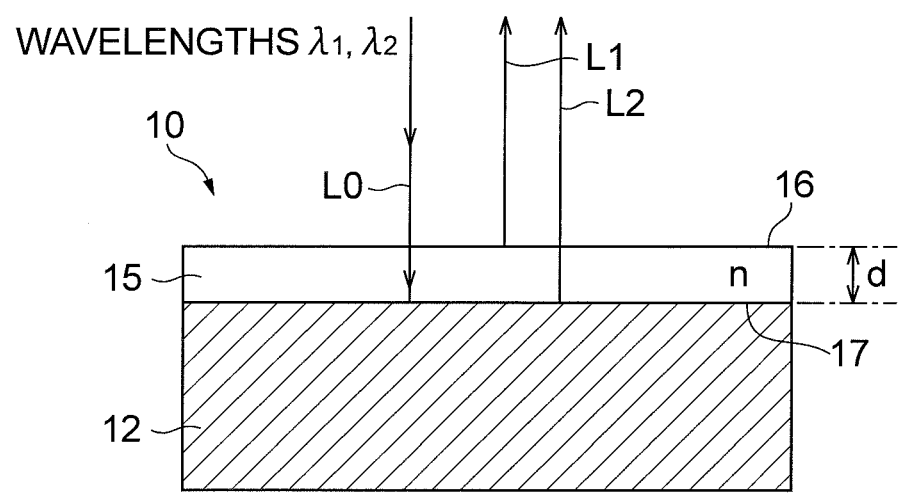
FIG. 1 is a view schematically showing a film thickness measurement method for a measuring object.

Hereinafter, preferred embodiments of a film thickness measurement apparatus and a film thickness measurement method according to the present invention will be described in detail with reference to the drawings. In the description of the drawings, elements identical to each other are provided with the same reference symbols, and overlapping description will be omitted. The dimensional ratios in the drawings are not always equal to those in the description.

First, a film thickness measurement method according to the present invention and a principle of measurement according to the method will be described with reference to FIG. 1 and FIG. 2. FIG. 1 is a view schematically showing a measurement method for measuring the film thickness of a measuring object. FIG. 2 is a figure including graphs schematically showing a principle of measurement of a temporal change in film thickness of a measuring object. The present film thickness measurement method is a method for measuring a temporal change in absolute value of the film thickness of a film-shaped measuring object having a first surface and a second surface. Hereinafter, description is given by setting the first surface of the measuring object as an upper surface on which measurement light is incident, and the second surface as a lower surface on the side opposite to the first surface.

In the example shown in FIG. 1, as an example of the film-shaped measuring object, a semiconductor film 15 formed on a substrate 12 is shown. It is assumed that an etching process is applied to this semiconductor film 15 as an example of a semiconductor manufacturing process that causes the film thickness to change with time. In the etching process, the film thickness d of the semiconductor film 15 decreases with time according to progress of the process.

For the temporal change of the film thickness d, measurement light L0 for film thickness measurement is supplied to a sample 10 including the substrate 12 and the semiconductor film 15 from the upper surface (first surface) 16 side of the semiconductor film 15 on the side opposite to the substrate 12. Then, by detecting interfering light generated by interference of reflected light L1 from the upper surface 16 and reflected light L2 from the lower surface (second surface, that is, the boundary surface between the substrate 12 and the semiconductor film 15) 17, the film thickness d of the semiconductor film 15 is measured. In FIG. 1, for easy viewing of the drawing, the optical path of the measurement light L0 with which the semiconductor film 15 is irradiated and the optical paths of the reflected light components L1 and L2 from the upper surface 16 and the lower surface 17 of the semiconductor film 15 are deviated in position from each other.

In this measurement method, in detail, the sample 10 including the semiconductor film 15 is irradiated with the measurement light L0 containing at least a first measurement light component with a first wavelength $\lambda_1$ and a second measurement light component with a second wavelength $\lambda_2$ different from the first wavelength (measurement light supply step). Next, the interfering light of the reflected light L1 and the reflected light L2 from the upper surface 16 and the lower surface 17 of the measurement light L0 is decomposed by wavelength so that the first interfering light component with the wavelength $\lambda_1$ and the second interfering light component with the wavelength $\lambda_2$ can be detected separately (spectroscopic step), and by detecting the intensities of the first and second interfering light components respectively at each time point, a change in interference intensity with time is acquired (detection step). Then, by referring to temporal changes in detected intensity of the first and second interfering light components, a temporal change in film thickness d of the semiconductor film 15 is obtained (film thickness analysis step).

Here, when n is a refractive index of the semiconductor film 15 as a measuring object, d is the film thickness that changes with time, and $\lambda$ is the wavelength of the measurement light L0, the intensity I(t) of the interfering light generated by interference of the reflected light components L1 and L2 shows a temporal change expressed by the following equation (1) based on an optical path length difference 2nd between the reflected light components L1 and L2.

[Equation 1]

$$I = A\cos\left(2\pi\frac{2nd}{\lambda}\right) + B \quad (1)$$

Specifically, when the measurement light L0 with a wavelength $\lambda$ is used, obtained interference intensity I(t) of reflected light components changes to assume a cosine wave according to a temporal change in film thickness d due to the etching process, etc. Here, A indicates amplitude of change of the interference intensity, and B indicates offset.

An example of a temporal change in intensity I(t) of the interfering light is shown in FIG. 2. The graph (a) in FIG. 2 indicates a temporal change in detected intensity I(t) of the first interfering light component with the first wavelength $\lambda_1$. A phase $\phi_1$ at each time point of the interference intensity I is expressed as:

[Equation 2]

$$\phi_1 = 2\pi\frac{2n_1 d}{\lambda_1} \quad (2)$$

provided that d is a film thickness at the time point. Here, $n_1$ is a refractive index of the semiconductor film 15 at the wavelength $\lambda_1$. In this temporal change, one period $\Delta t_1$ thereof corresponds to a time in which the film thickness d changes by $\Delta d = \lambda_1/2n_1$.

Similarly, the graph (b) in FIG. 2 indicates a temporal change in detected intensity I(t) of the second interfering light component with the second wavelength $\lambda_2$. A phase $\phi_2$ at each time point of the interference intensity I is similarly expressed as:

[Equation 3]

$$\phi_2 = 2\pi\frac{2n_2 d}{\lambda_2} \quad (3)$$

Here, $n_2$ is a refractive index of the semiconductor film 15 at the wavelength $\lambda_2$. In this temporal change, one period $\Delta t_2$ thereof corresponds to a time in which the film thickness d changes by $\Delta d = \lambda_2/2n_2$.

As shown in the above-described equations (2) and (3), and the graphs (a) and (b) in FIG. 2, in the reflected interfering light from the semiconductor film 15 according to supply of the measurement light L0 containing light components with wavelengths $\lambda_1$ and $\lambda_2$, the phases $\phi_1$ and $\phi_2$ in the temporal changes in detected intensity of the first and second interfering light components and the periods $\Delta t_1$ and $\Delta t_2$ are different from each other with respect to a change in the film thickness d, because the wavelengths $\lambda_1$ and $\lambda_2$ are different. The phases $\phi_1$ and $\phi_2$ of these temporal changes of the interference intensities can be obtained, for example, by performing FFT (Fast Fourier Transform) analysis of data in a predetermined range (preferably, range of two or more periods) of the interference intensity I.

Further, when a phase difference between the two wavelengths, between the phases $\phi_1$ and $\phi_2$ of the first and second interfering light components with the wavelengths $\lambda_1$ and $\lambda_2$ is calculated, the phase difference $\Delta\phi_{12}$ is expressed by the following equation (4).

[Equation 4]

$$\Delta\phi_{12} = 2\pi\frac{2n_1 d}{\lambda_1} - 2\pi\frac{2n_2 d}{\lambda_2} = 4\pi\left(\frac{n_1}{\lambda_1} - \frac{n_2}{\lambda_2}\right)d \quad (4)$$

Specifically, the phase difference $\Delta\phi_{12}$ between the first phase $\phi_1$ and the second phase $\phi_2$ changes in proportion to the film thickness d of the measuring object. Therefore, as shown by the graph (c) in FIG. 2, based on the change of the phase difference $\Delta\phi_{12}$ according to temporal changes in detected intensity of the first and second interfering light components, an absolute value of the film thickness d of the semiconductor layer 15 and a temporal change thereof can be accurately obtained.

By measuring the temporal change of the absolute value of the film thickness d, for example, in an etching process of the semiconductor film 15, detection of the end point and process control based on the detection can be highly accurately performed. In detail, on the assumption that the final film thickness of the semiconductor film 15 as a target in the etching process is defined as D, the relationship between the target film thickness D and a corresponding target phase difference $\Delta\Phi$ is expressed by the following equations (5.1) and (5.2).

[Equation 5]

$$\Delta\Phi = 2\pi \frac{2n_1 D}{\lambda_1} - 2\pi \frac{2n_2 D}{\lambda_2} = 4\pi\left(\frac{n_1}{\lambda_1} - \frac{n_2}{\lambda_2}\right)D \quad (5.1)$$

$$D = \Delta\Phi / 4\pi\left(\frac{n_1}{\lambda_1} - \frac{n_2}{\lambda_2}\right) \quad (5.2)$$

Therefore, by using this relationship, according to a method in which, for example, a time point of judgment that the film thickness d of the semiconductor film 15 has decreased to the desired film thickness D based on a measured phase difference $\Delta\phi$ is determined as an end point of the etching process, end point detection of the etching process can be performed as shown by the graph (c) in FIG. 2. This process control can also be performed in a similar way in control of, for example, a thin-film formation process, that causes the film thickness d of the semiconductor film 15 to increase with time.

Here, as is understood from the graph (c) in FIG. 2, it becomes possible to measure the absolute value of the film thickness d according to the above-described method when the phase difference $\Delta\phi_{12}$ changes in the range of 0 to $2\pi$ (in the range $\Delta t_{12}$ in the graph (c)). Therefore, the maximum value $d_{max}$ of the film thickness whose absolute value can be measured according to the above-described method is expressed by the following equation (6).

[Equation 6]

$$d_{max} = 1/2\left(\frac{n_1}{\lambda_1} - \frac{n_2}{\lambda_2}\right) \quad (6)$$

Therefore, in the case where the film thickness d is out of the above-described range when the measurement is started, it is preferable that the film thickness measurement is performed by a different method for the beginning, and when the film thickness d falls within the range in which its absolute value can be measured, the measurement is switched to the film thickness measurement according to the above-described method. As such a different film thickness measurement method, there is a method, for example, in which a relative film thickness change from a film thickness given as an initial value is measured. In this case, a method can be used in which reflected interfering light of measurement light with one wavelength is detected, and from a temporal change in intensity thereof, a rate of change in film thickness (for example, etching rate) is obtained, and by subtracting the film thickness change amount from the film thickness initial value, a film thickness is acquired.

Figure 3:
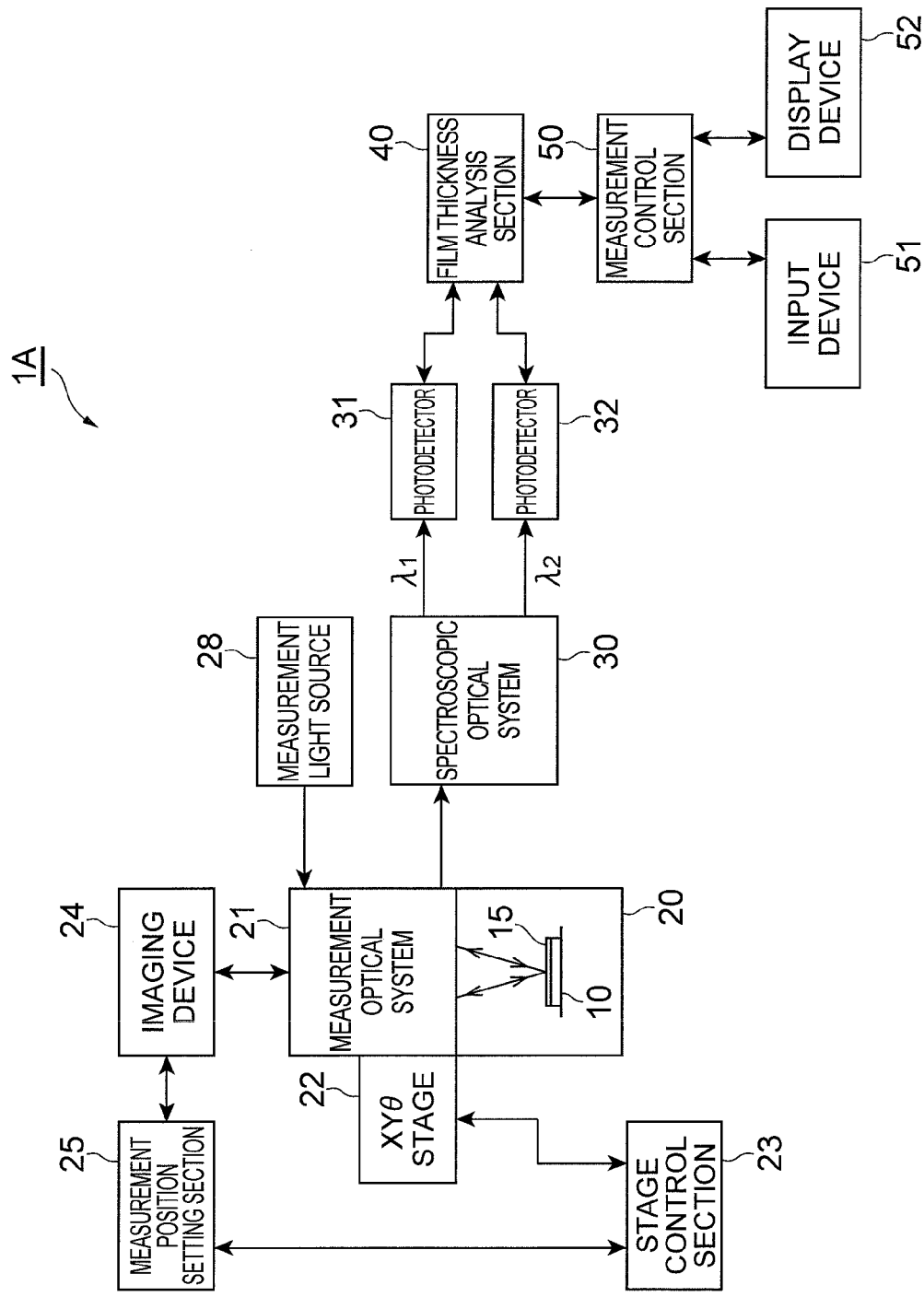
FIG. 3 is a block diagram showing a configuration of an embodiment of a film thickness measurement apparatus.

FIG. 3 is a block diagram showing a configuration according to an embodiment of a film thickness measurement apparatus. The present embodiment shows an example in which the semiconductor film 15 of the sample 10 (refer to FIG. 1) set inside a processing chamber of a semiconductor processing unit (for example, an etching unit) 20 is used as a measuring object. The film thickness measurement apparatus 1A includes a measurement optical system 21, a measurement light source 28, a spectroscopic optical system 30, photodetectors 31 and 32, and a film thickness analysis section 40.

The measurement light source 28 that supplies measurement light L0 to the semiconductor film 15 of the sample 10 inside the processing unit 20 via the measurement optical system 21 is provided. This measurement light source 28 supplies the measurement light L0 containing at least a measurement light component with a first wavelength $\lambda_1$ and a measurement light component with a second wavelength $\lambda_2$ to the semiconductor film 15 as a measuring object as described above with reference to FIG. 1 and FIG. 2. As the measurement light source 28, for example, a white light source that supplies white light with a wavelength region including the first wavelength $\lambda_1$ and the second wavelength $\lambda_2$ as the measurement light L0 can be preferably used.

Figure 4:
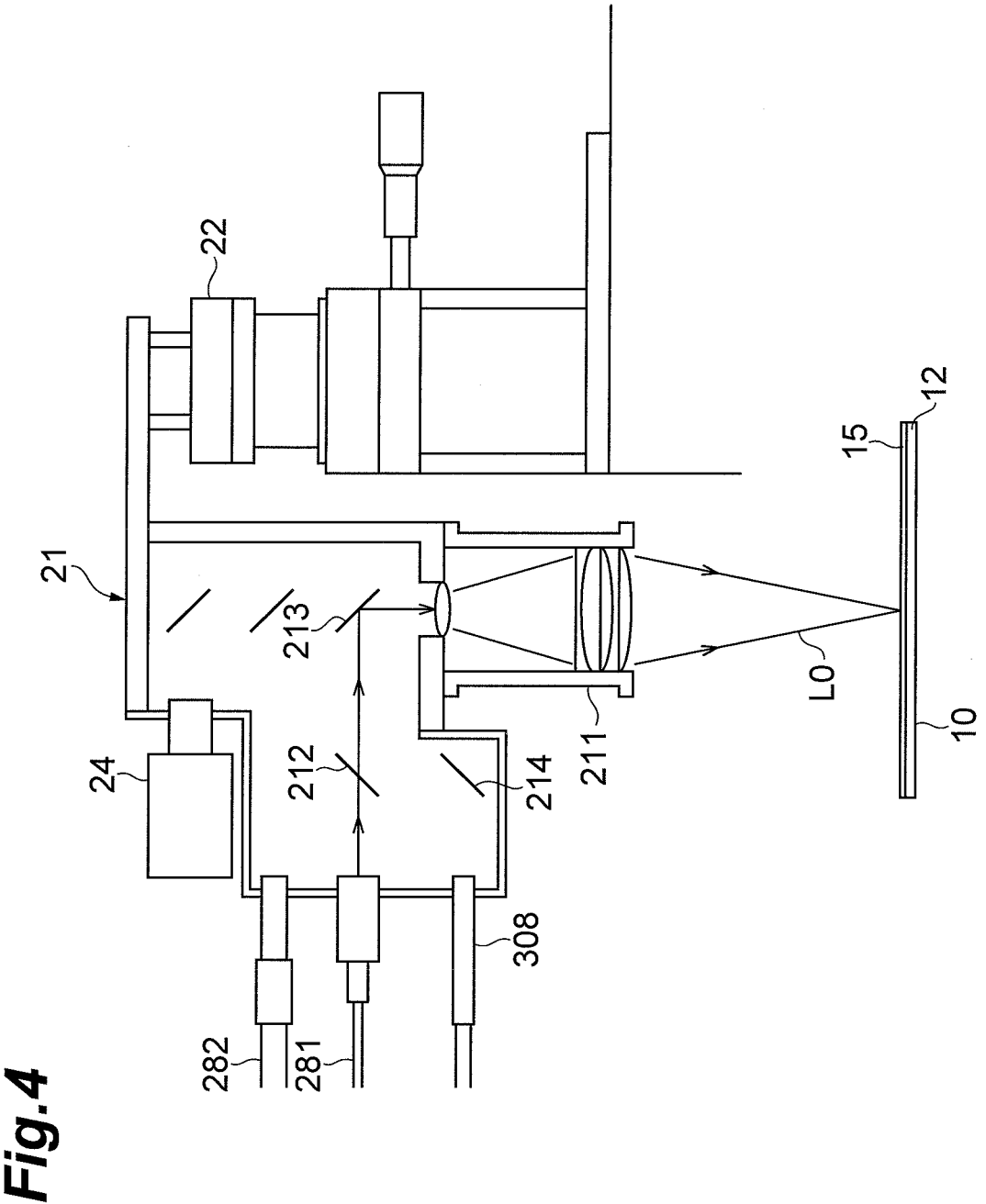
FIG. 4 is a view showing an example of a configuration of a measurement optical system.
Figure 5:
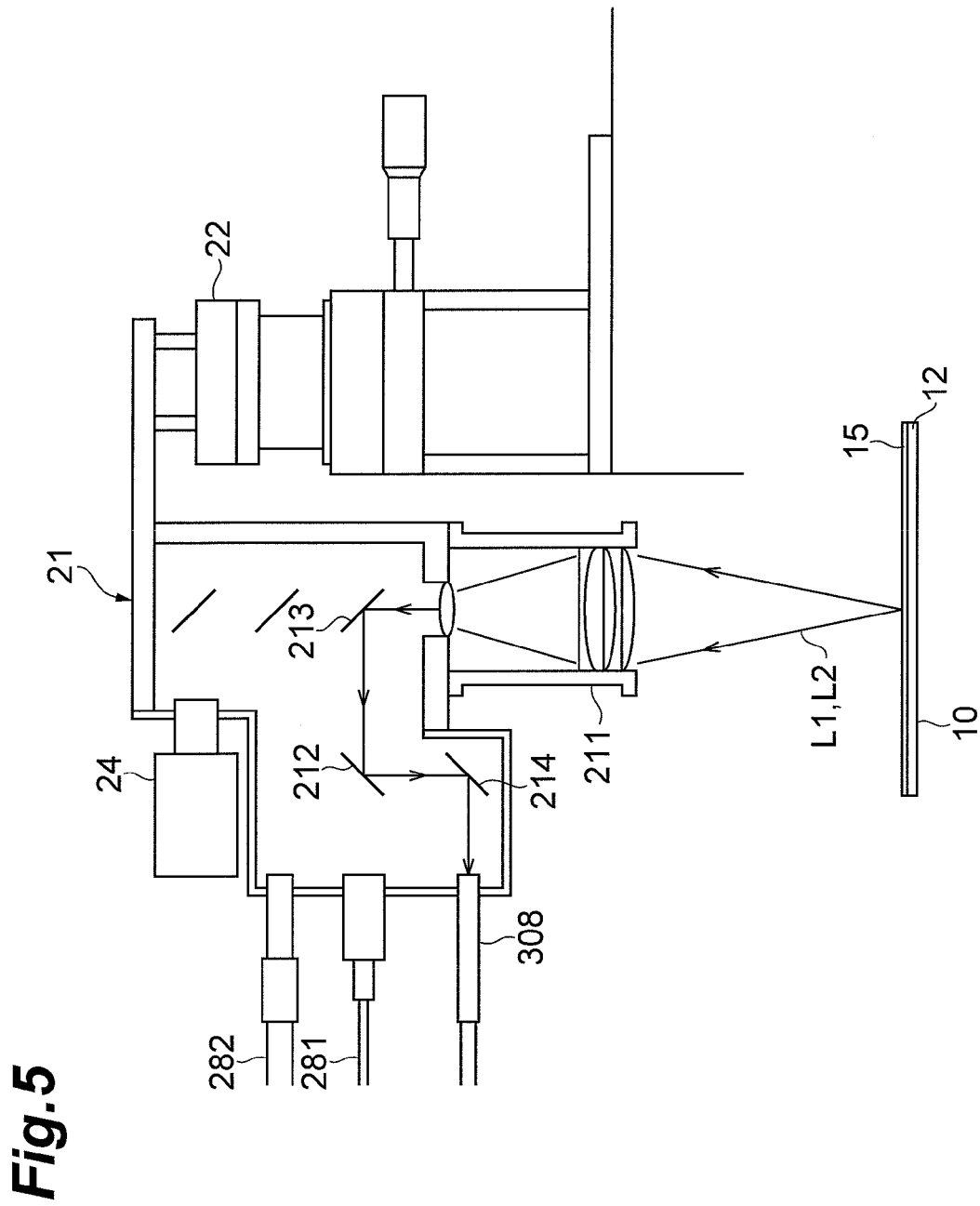
FIG. 5 is a view showing an example of a configuration of the measurement optical system.

For reflected light L1 and reflected light L2 generated by reflection of the measurement light L0 by the sample 10, the spectroscopic optical system 30 and the photodetectors 31 and 32 are provided via the measurement optical system 21. Here, FIG. 4 and FIG. 5 are views showing an example of a configuration of the measurement optical system 21 in the film thickness measurement apparatus 1A. In this configuration example, to the measurement optical system 21 including an objective lens 211 opposed to the sample 10, a measurement light input fiber 281 that guides the measurement light from the measurement light source 28, an illumination light input fiber 282 that guides illumination light to be used for acquiring an image of the sample 10, etc., and a reflected light output fiber 308 that guides reflected light from the sample 10 to the spectroscopic optical system 30 are connected.

In this configuration, as shown in FIG. 4, the measurement light L0 from the measurement light source 28 is input into the measurement optical system 21 by the input fiber 281, passes through a half mirror 212, and is reflected by a reflecting mirror 213, and supplied to the semiconductor film 15 of the sample 10 via the objective lens 211. As shown in FIG. 5, reflected light components L1 and L2 from the upper surface and the lower surface of the semiconductor film 15 are reflected by the reflecting mirror 213, the half mirror 212, and the reflecting mirror 214, and output to the spectroscopic optical system 30 via the output fiber 308.

The spectroscopic optical system 30 is spectroscopic means that disperses the reflected light input from the sample 10 via the measurement optical system 21. In detail, the spectroscopic optical system 30 decomposes interfering light generated by interference of the reflected light L1 from the upper surface and the reflected light L2 from the lower surface of the semiconductor film 15 of the measurement light L0 into a first interfering light component in the interfering light with the wavelength $\lambda_1$ caused by the first measurement light component and the second interfering light component with the wavelength $\lambda_2$ caused by the second measurement light component so as to be detectable separately.

Figure 6:
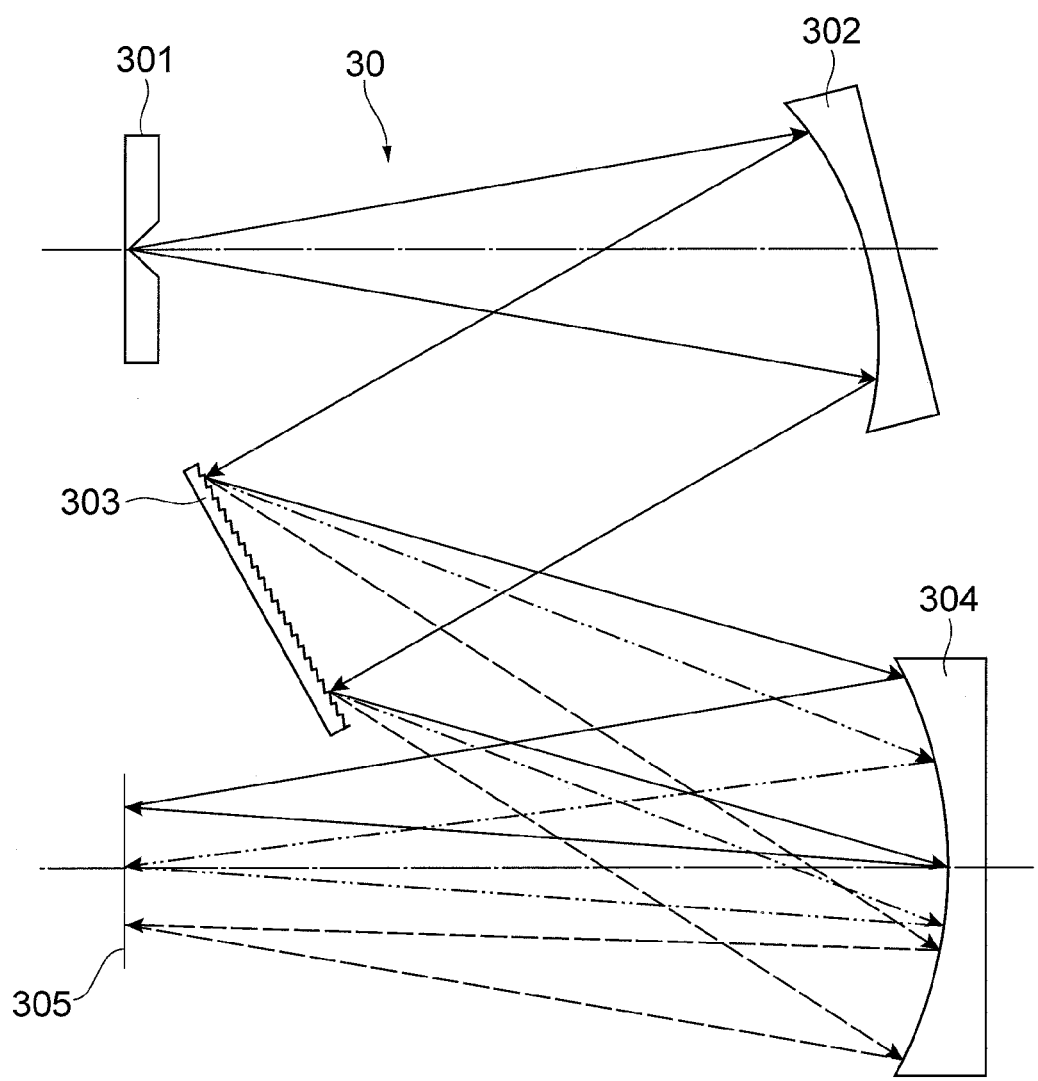
FIG. 6 is a view showing an example of a configuration of a spectroscopic optical system.

FIG. 6 is a view showing an example of a configuration of the spectroscopic optical system 30. The spectroscopic optical system 30 includes an entrance slit 301, a collimating optical system 302, a diffraction grating 303 as a dispersion element, and a focusing optical system 304. In this configuration, the interfering light decomposed into interfering light components with respective wavelengths by the diffraction grating 303 is imaged on a wavelength spectrum output plane 305 via the focusing optical system 304, and detected by wavelength component by the photodetectors disposed at the output plane 305.

As detection means for detecting intensities (interference intensities) respectively at each time point t of the first interfering light component with the wavelength $\lambda_1$ and the second interfering light component with the wavelength $\lambda_2$ of the interfering light decomposed by wavelength component by the spectroscopic optical system 30, photodetectors 31 and 32 are provided. The first photodetector 31 detects the first interfering light component with the wavelength $\lambda_1$ and outputs a detection signal indicating the intensity of the component. The second photodetector 32 detects the second interfering light component with the wavelength $\lambda_2$ and outputs a detection signal indicating the intensity of the component.

Such detection means may consist of, for example, a multichannel photodetector disposed at the output plane 30S of the spectroscopic optical system 30 shown in FIG. 6 and including a plurality of photodetection elements aligned for detecting intensities of the interfering light components decomposed by the spectroscopic optical system 30. In this case, among the plurality of photodetection elements of the photodetector, one or a plurality of photodetection elements that detect the first interfering light component of the wavelength $\lambda_1$ function as the first photodetector 31. Similarly, one or a plurality of photodetection elements that detect the second interfering light component of the wavelength $\lambda_2$ function as the second photodetector 32.

Detection signals from the photodetectors 31 and 32 are input into the film thickness analysis section 40. The film thickness analysis section 40 is, as described above with reference to FIG. 2, film thickness analysis means that obtains a phase difference $\Delta\phi_{12}$ between a first phase $\phi_1$ in a temporal change in detected intensity of the first interfering light component and a second phase $\phi_2$ in a temporal change in detected intensity of the second interfering light component, and obtains a temporal change of the film thickness d of the semiconductor film 15 as a measuring object based on the phase difference.

Figure 7:
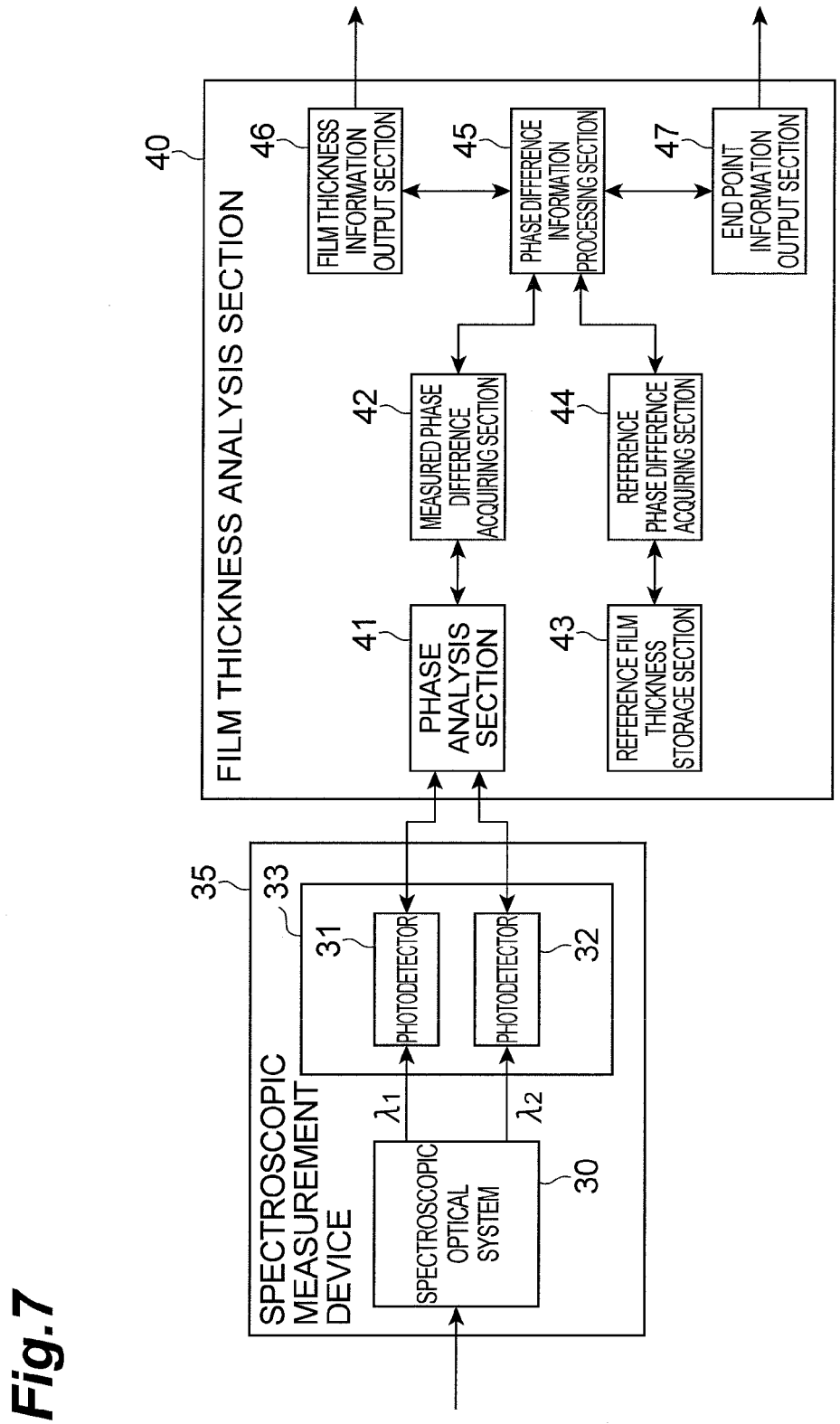
FIG. 7 is a block diagram showing an example of a configuration of a film thickness analysis section.

FIG. 7 is a block diagram showing an example of a configuration of the film thickness analysis section 40. The film thickness analysis section 40 according to this configuration example includes a phase analysis section 41, a measured phase difference acquiring section 42, a phase difference information processing section 45, and a film thickness information output section 46. In FIG. 7, the spectroscopic means and the detection means are configured as a spectroscopic measurement device 35 including the spectroscopic optical system 30 and the multi-channel photodetector 33 including the first and second photodetectors 31 and 32. The phase analysis section 41 inputs detection signals from the spectroscopic measurement device 35, and calculates a first phase $\phi_1$ in the interfering light component detected by the photodetector 31, and a second phase $\phi_2$ in the interfering light component detected by the photodetector 32.

The measured phase difference acquiring section 42 calculates the phase difference $\Delta\phi_{12}$ between the phases $\phi_1$ and $\phi_2$ of the first and second interfering light components calculated by the phase analysis section 41. The phase difference information processing section 45 applies predetermined data processing to the phase difference $\Delta\phi_{12}$ acquired by the measured phase difference acquiring section 42, and based on the phase difference $\Delta\phi_{12}$, derives necessary information on an absolute value of the film thickness d of the semiconductor film 15 as a measuring object and a temporal change in absolute value.

In detail, the phase difference information processing section 45 calculates an absolute value of the film thickness d as film thickness information from the measured phase difference $\Delta\phi_{12}$ based on the relational expression shown in the equation (4). Alternatively, the processing section 45 may derive information on the phase difference $\Delta\phi_{12}$ not converted into the film thickness d as film thickness information that indicates the film thickness d. The film thickness information output section 46 outputs information on the film thickness d of the semiconductor film 15 obtained in the phase difference information processing section 45.

Further, in the film thickness analysis section 40 shown in FIG. 7, a configuration for detecting an end point of an etching process by supposing a temporal change in which the film thickness d of the semiconductor film 15 decreases due to the etching process is shown. For this end point detection, the film thickness analysis section 40 of this configuration example further includes a reference film thickness storage section 43, a reference phase difference acquiring section 44, and an end point information output section 47.

In the reference film thickness storage section 43, a reference film thickness (target film thickness) D showing a value of the film thickness d of the semiconductor film 15 which should be an end point of the etching process is stored in advance. The reference phase difference acquiring section 44 calculates a reference phase difference (target phase difference) $\Delta\Phi$ corresponding to the reference film thickness D read from the storage section 43 as shown by the equation (5.1). The phase difference information processing section 45 compares the measured phase difference $\Delta\phi_{12}$ acquired by the measured phase difference acquiring section 42 with the reference phase difference $\Delta\Phi$ acquired by the reference phase difference acquiring section 44.

Then, the processing section 45 determines whether the etching process has reached the end point based on, for example, whether the measured phase difference $\Delta\phi_{12}$ and the reference phase difference $\Delta\Phi$ match each other, and when it is determined that the end point has been reached, the processing section outputs an end point detection signal for stopping the etching process via the end point information output section 47. The film thickness analysis section 40 may consist of, for example, a computer on which a predetermined analysis program is executed.

In the film thickness measurement apparatus 1A shown in FIG. 3, a measurement control section 50 is provided in addition to the above-described film thickness analysis section 40. The measurement control section 50 performs necessary control for a film thickness measuring operation in the measurement apparatus 1A and an operation of an etching process in the processing unit 20, etc., by controlling the respective sections of the measurement apparatus 1A and the processing unit 20 by referring to film thickness information from the film thickness information output section 46 of the film thickness analysis section 40 or further referring to end point information from the end point information output section 47.

To this measurement control section 50, an input device 51 and a display device 52 are connected. The input device 51 is used to input information, conditions, and instructions, etc., by an operator, necessary for measurement operations in the measurement apparatus 1A and processing operations in the processing unit 20. This input device 51 can be used to input, for example, measurement wavelengths $\lambda_1$ and $\lambda_2$ to be used in the film thickness analysis section 40, refractive indexes $n_1$ and $n_2$ of the measuring object at the wavelengths, and a target film thickness D of the etching process, etc. A film thickness value when starting the process may also be input. However, it is also possible that these conditions and values are prepared in advance in the film thickness analysis section 40. The display device 52 is used to display information necessary for the above-described measurement operations and processing operations to an operator.

In the film thickness measurement apparatus 1A of the present embodiment, for the measurement optical system 21, an $XY\theta$ stage 22 is provided. The $XY\theta$ stage 22 is used to adjust the position of measurement of the film thickness d on the semiconductor film 15 and conditions of measurement by the film thickness measurement apparatus 1A by adjusting the position and angle, etc., of the measurement optical system 21 in the X direction, Y direction, and θ direction. Further, driving of the XYθ stage 22 is controlled by a stage control section 23.

For the sample 10 inside the processing unit 20 and the measurement optical system 21, an imaging device 24 and a measurement position setting section 25 are further provided. The imaging device 24 is a position confirming imaging device for confirming a position of measurement of the film thickness d on the semiconductor film 15 by the measurement apparatus 1A. The measurement position setting section 25 sets a film thickness measurement position with respect to the sample 10 by referring to an image of the sample 10 including the semiconductor film 15 acquired by the imaging device 24 via the measurement optical system 21.

Figure 8:
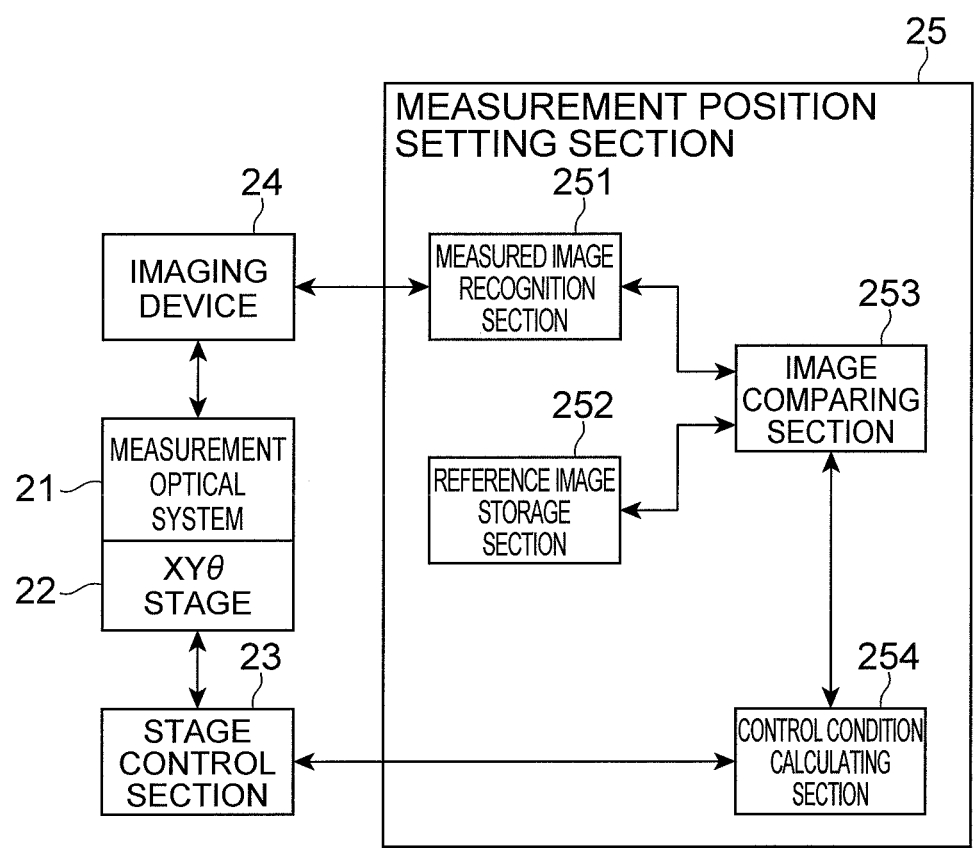
FIG. 8 is a block diagram showing an example of a configuration of a measurement position setting section.

FIG. 8 is a block diagram showing an example of a configuration of the measurement position setting section 25. The measurement position setting section 25 according to this configuration example includes a measured image recognition section 251, a reference image storage section 252, an image comparing section 253, and a control condition calculating section 254. The measured image recognition section 251 inputs image data of the sample 10 acquired by the imaging device 24, and performs pattern recognition of the measured pattern in the image. In the reference image storage section 252, a reference image for identifying a position that should be set as a measurement position of the film thickness d on the semiconductor film 15 is stored in advance.

The image comparing section 253 compares a measured pattern in the measured image recognized by the recognition section 251 with a reference pattern in a reference image stored in the storage section 252 according to a method such as calculation of a difference image. Based on the result of comparison between the measured image and the reference image in the image comparing section 253, the control condition calculating section 254 determines whether the measurement position needs to be adjusted, and when it needs to be adjusted, calculates the control conditions. Then, based on control conditions obtained by the calculating section 254, driving of the XYθ stage 22 and the measurement optical system 21 is controlled via the stage control section 23, and accordingly, the measurement position and measurement conditions of the film thickness d for the semiconductor film 15 of the sample 10 are set and controlled.

The measurement position of the film thickness d with respect to the semiconductor film 15 of the sample 10 is preferably set at a position of TEG on the semiconductor wafer. The reason for this is because if the measurement position is set at a position on a semiconductor chip, a level difference, etc., caused by a mask, etc., may influence it and the film thickness d may not be accurately measured.

Effects of the film thickness measurement apparatus and the film thickness measurement method according to the above-described embodiment will be described.

In the film thickness measurement apparatus 1A and the film thickness measurement method shown in FIG. 1 to FIG. 3, measurement light L0 containing light components with first and second wavelengths $\lambda_1$ and $\lambda_2$ is supplied to the semiconductor film 15 on the substrate 12 as a film-shaped measuring object, and interfering light of reflected light components L1 and L2 from the upper surface 16 and the lower surface 17 is dispersed and detected by the spectroscopic optical system 30 and the photodetectors 31 and 32. Then, by acquiring a phase difference $\Delta\phi_{12}$ between a phase $\phi_1$ of the interfering light component of the wavelength $\lambda_1$ detected by the photodetector 31 and a phase $\phi_2$ of the interfering light component of the wavelength $\lambda_2$ detected by the photodetector 32, a temporal change in film thickness d of the semiconductor film 15 is obtained. With this configuration, from the phase difference between temporal waveforms of detected intensities of the two wavelengths, it becomes possible to accurately measure an absolute value of the film thickness d of the measuring object and a temporal change thereof.

A specific measuring object of film thickness measurement may be, as described above, the semiconductor film 15 on the substrate 12, and preferably, a temporal change of the film thickness d of the semiconductor film 15 is measured during execution of a predetermined process. In this configuration, during execution of a semiconductor process such as an etching process or a thin-film formation process, etc., which causes the film thickness d of the semiconductor film 15 to decrease or increase, process control such as detection of an end point of the process can be accurately performed. The above-described method is generally applicable to measurement of the film thickness d of a film-shaped measuring object as well as the semiconductor film 15.

As a specific configuration of the film thickness measurement apparatus 1A, a configuration in which the measurement light source 28 is a white light source that supplies white light with a wavelength region including the first and second wavelengths $\lambda_1$ and $\lambda_2$ as measurement light L0 can be used. Accordingly, measurement light L0 containing at least measurement light components with the first and second wavelengths $\lambda_1$ and $\lambda_2$ can be preferably supplied. As a configuration of the spectroscopic means that disperses interfering light of reflected light components L1 and L2 from the sample 10 and the detection means that detects interfering light, as described above, a configuration in which the spectroscopic means includes the spectroscopic optical system 30 that decomposes interfering light into interfering light components with the respective wavelengths, and the detection means includes a multi-channel photodetector including a plurality of photodetection elements arrayed for detecting intensities of the respective interfering light components decomposed by the spectroscopic optical system 30, can be used.

For the measurement light source, the spectroscopic means, and the detection means to be used for film thickness measurement, various configurations other than the above-described configurations can also be used. For example, any measurement light source can be used as long as it can supply measurement light L0 containing at least measurement light components with the first and second wavelengths $\lambda_1$ and $\lambda_2$. As such a measurement light source, for example, a light source capable of concurrently supplying a plurality of monochromatic light components, for example, a configuration including a combination of a plurality of semiconductor lasers or LEDs, can be used.

As the spectroscopic means, a wavelength selection filter, for example, band-pass filter can be used as well as the spectroscopic optical system. As the detection means, a photodetector, for example, a photodiode installed in combination with a wavelength selection filter, can be used. In this case, the spectroscopic means and the detection means may consist of, for example, a first wavelength selection filter and a first photodetector for the first wavelength $\lambda_1$ and a second wavelength selection filter and a second photodetector for the second wavelength $\lambda_2$.

Measurement processing and measurement conditions, etc., for measuring the film thickness d of a measuring object by using the film thickness measurement apparatus 1A and the film thickness measurement method according to the above-described embodiment will be further described along with specific measurement examples.

FIG. 9 is a figure including graphs showing a first measurement example of film thickness measurement by the above-described measurement method. In this measurement example, the first wavelength is $\lambda_1=335$ nm and the second wavelength is $\lambda_2=405$ nm. In this case, the wavelength interval is $\lambda_2-\lambda_1=70$ nm. In FIG. 9, the graph (a) shows a temporal change in detected intensity I of the interfering light component with the first wavelength $\lambda_1$, the graph (b) shows a temporal change in detected intensity I of the interfering light component with the second wavelength $\lambda_2$, and the graph (c) shows a temporal change in film thickness d of the measuring object corresponding to the phase difference $\Delta\phi_{12}$. As shown by these graphs, based on the phase difference between temporal changes of the detected intensities of the first and second interfering light components, an absolute value of the film thickness d of the semiconductor film 15 as the measuring object and a temporal change thereof can be accurately obtained.

In the above-described measurement example, it is assumed that the refractive index of the semiconductor film 15 at the wavelength $\lambda_1=335$ nm is $n_1=2.7$, the refractive index at the wavelength $\lambda_2=405$ nm is $n_2=2.5$, and a target film thickness in an etching process is D=100 nm. In this case, as shown by the graph (d) in FIG. 9, by setting the target film thickness D as a threshold for a temporal change in absolute value of the measured film thickness d, an end point of etching can be detected.

A range in which the absolute value of the film thickness d of the measuring object can be measured is a period during which the phase difference changes within the range of 0 to $2\pi$. In this measurement example, a maximum value $d_{max}$ of the film thickness whose absolute value is measurable is obtained as follows.

$$2\pi \frac{2n_{335\,nm}d_{max}}{\lambda_1 = 335\text{ nm}} - 2\pi \frac{2n_{405\,nm}d_{max}}{\lambda_2 = 405\text{ nm}} = 2\pi \quad \text{[Equation 7]}$$

$$\frac{2 \times 2.7 \times d_{max}}{335\text{ nm}} - \frac{2 \times 2.5 \times d_{max}}{405\text{ nm}} = 1$$

$$d_{max} = 264.99\text{ nm}$$

Specifically, in this measurement example, when the film thickness d of the measuring object is not more than 264.99 nm, the absolute value of the film thickness d can be measured according to the above-described method.

Figure 10:
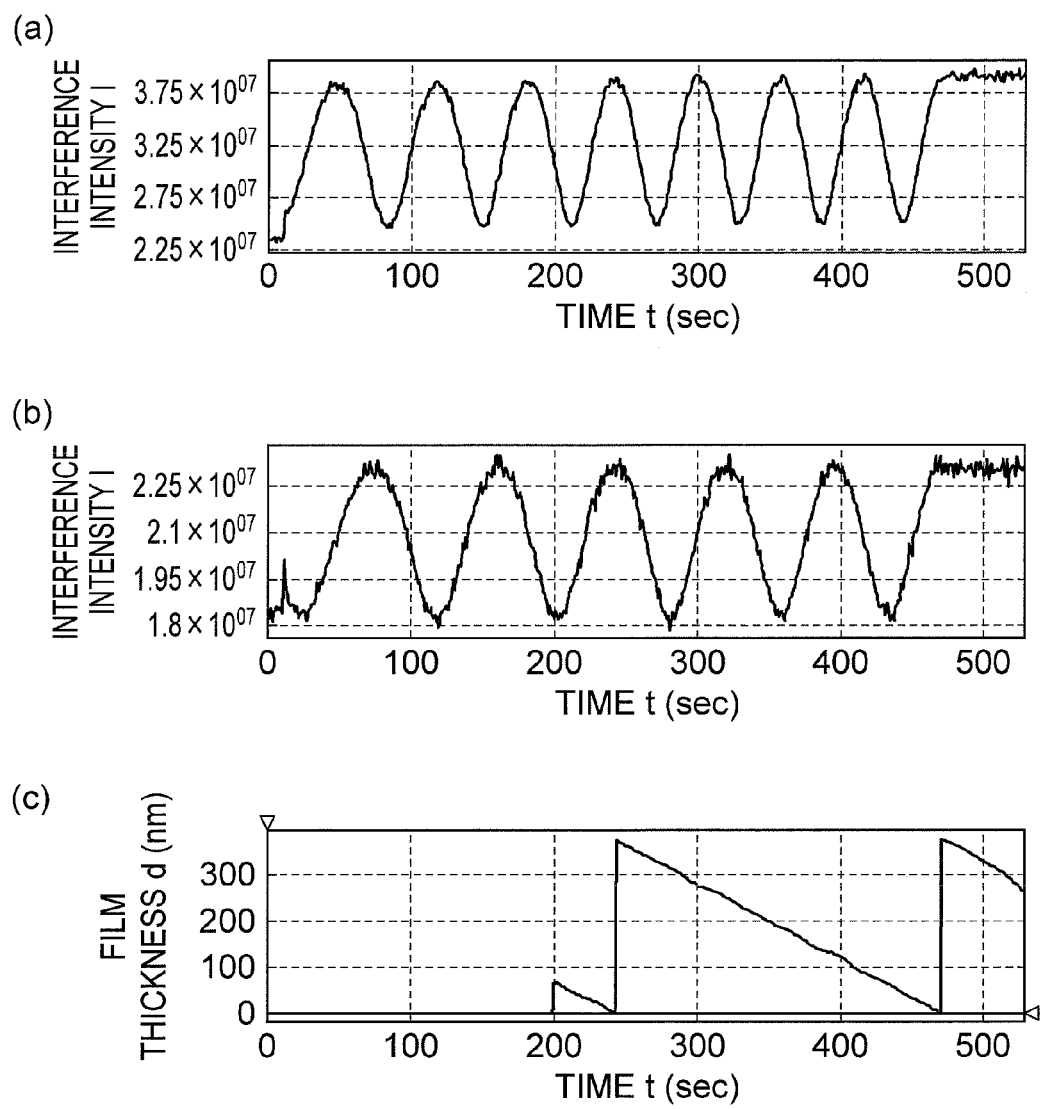
FIG. 10 includes graphs showing a second measurement example of film thickness measurement.

In the measurement of the film thickness d of the measuring object according to the above-described configuration, the measurable range of the film thickness d and the measurement accuracy (resolution) depend on the settings of the wavelengths $\lambda_1$ and $\lambda_2$ of light used for measurement. Here, FIG. 10 is a figure including graphs showing a second measurement example of film thickness measurement according to the above-described method, and the graph (a) shows a temporal change in detected intensity I of the first interfering light component, the graph (b) shows a temporal change in detected intensity I of the second interfering light component, and the graph (c) shows a temporal change in film thickness d of the measuring object. In this measurement example, the first wavelength is $\lambda_1=600$ nm, the second wavelength is $\lambda_2=790$ nm, and the wavelength interval is 190 nm.

FIG. 11 is a figure including graphs showing a third measurement example of film thickness measurement according to the above-described method, and the graph (a) shows a temporal change in detected intensity I of the first interfering light component, the graph (b) shows a temporal change in detected intensity I of the second interfering light component, and the graph (c) shows a temporal change in film thickness d of the measuring object. In this measurement example, the first wavelength is $\lambda_1=405$ nm, the second wavelength is $\lambda_2=600$ nm, and the wavelength interval is 195 nm.

As shown by these graphs in FIG. 9 to FIG. 11, the correspondence between the phase difference $\Delta\phi_{12}$ and the film thickness d measured in the measurement apparatus 1A, the measurable film thickness range, and the measurement accuracy change depending on the settings of the wavelengths $\lambda_1$ and $\lambda_2$. Therefore, by setting or changing the wavelengths $\lambda_1$ and $\lambda_2$ to be used for film thickness measurement, the measurement conditions of the film thickness d can be set or changed.

In this case, it is preferable that the measurement light source 28 is configured to be capable of supplying three or more measurement light components with wavelengths different from each other as components of the measurement light L0. Further, it is preferable that the spectroscopic means and the detection means, for example including the spectroscopic optical system 30 and the photodetectors 31 and 32, are configured to be capable of changing the wavelengths $\lambda_1$ and $\lambda_2$ to be used for the measurement. With this configuration, according to the state of the temporal change in film thickness d of the measuring object, the measurement conditions can be preferably set and changed. In this case, as the measurement light source 28, a white light source or a light source including a combination of three types or more of monochromatic light sources, etc., can be used. As the spectroscopic means and the detection means, a configuration including a combination of a spectroscopic optical system (spectroscope) and a multi-channel photodetector can be used.

For adjustment of the film thickness measurement conditions by changing the wavelengths $\lambda_1$ and $\lambda_2$, for example, as shown in FIG. 9 to FIG. 11, there is a method in which the measurement conditions are adjusted by changing (shifting) the wavelength region of the wavelengths $\lambda_1$ and $\lambda_2$. Alternatively, there is a method in which the measurement conditions are adjusted by changing (widening or narrowing) the wavelength interval $\Delta\lambda=\lambda_2-\lambda_1$ without changing the wavelength region. In the configuration to change the wavelengths $\lambda_1$ and $\lambda_2$, when measuring a temporal change in which the film thickness d of a measuring object decreases, it is preferable that the first and second wavelengths $\lambda_1$ and $\lambda_2$ are changed so that the wavelength interval $\Delta\lambda$ between the two wavelengths is widened in a phased manner with time. An example of such a measurement is measurement of a temporal change in film thickness d of the semiconductor film 15 on the substrate 12 during execution of an etching process.

In detail, in the example with the wavelengths $\lambda_1=335$ nm and $\lambda_2=405$ nm shown in FIG. 9, for example, the measurable maximum value of the film thickness d is, as described above, $d_{max}=264.99$ nm. On the other hand, a case where $\lambda_1=400$ nm and $\lambda_2=402$ nm by narrowing the wavelength interval $\Delta\lambda$ in the same wavelength region is considered. In this case, assuming that the refractive indexes of the semiconductor film 15 at the wavelengths $\lambda_1$ and $\lambda_2$ are $n_1=n_2=2.5$, the maximum value $d_{max}$ of the film thickness whose absolute value is measurable is obtained as follows.

$$\frac{2 \times 2.5 \times d_{max}}{400\text{ nm}} - \frac{2 \times 2.5 \times d_{max}}{402\text{ nm}} = 1 \quad \text{[Equation 8]}$$

$$d_{max} = 16080\text{ nm}$$

Specifically, in the same wavelength region, when the wavelength interval $\Delta\lambda$ of the wavelengths $\lambda_1$ and $\lambda_2$ is narrowed, the measurable film thickness range widens. However, in this case where the wavelength interval is narrowed, the resolution and measurement accuracy of the film thickness measurement are reduced. On the other hand, when the wavelength interval $\Delta\lambda$ of the wavelengths $\lambda_1$ and $\lambda_2$ is widened, although the measurable film thickness range becomes narrower, the resolution and measurement accuracy of the film thickness measurement are improved. Therefore, in measurement of the film thickness d, it is preferable that, by considering the relationship between the wavelength interval $\Delta\lambda$ and the measurement range and measurement accuracy, the wavelengths $\lambda_1$ and $\lambda_2$ are switched as appropriate.

Figure 12:
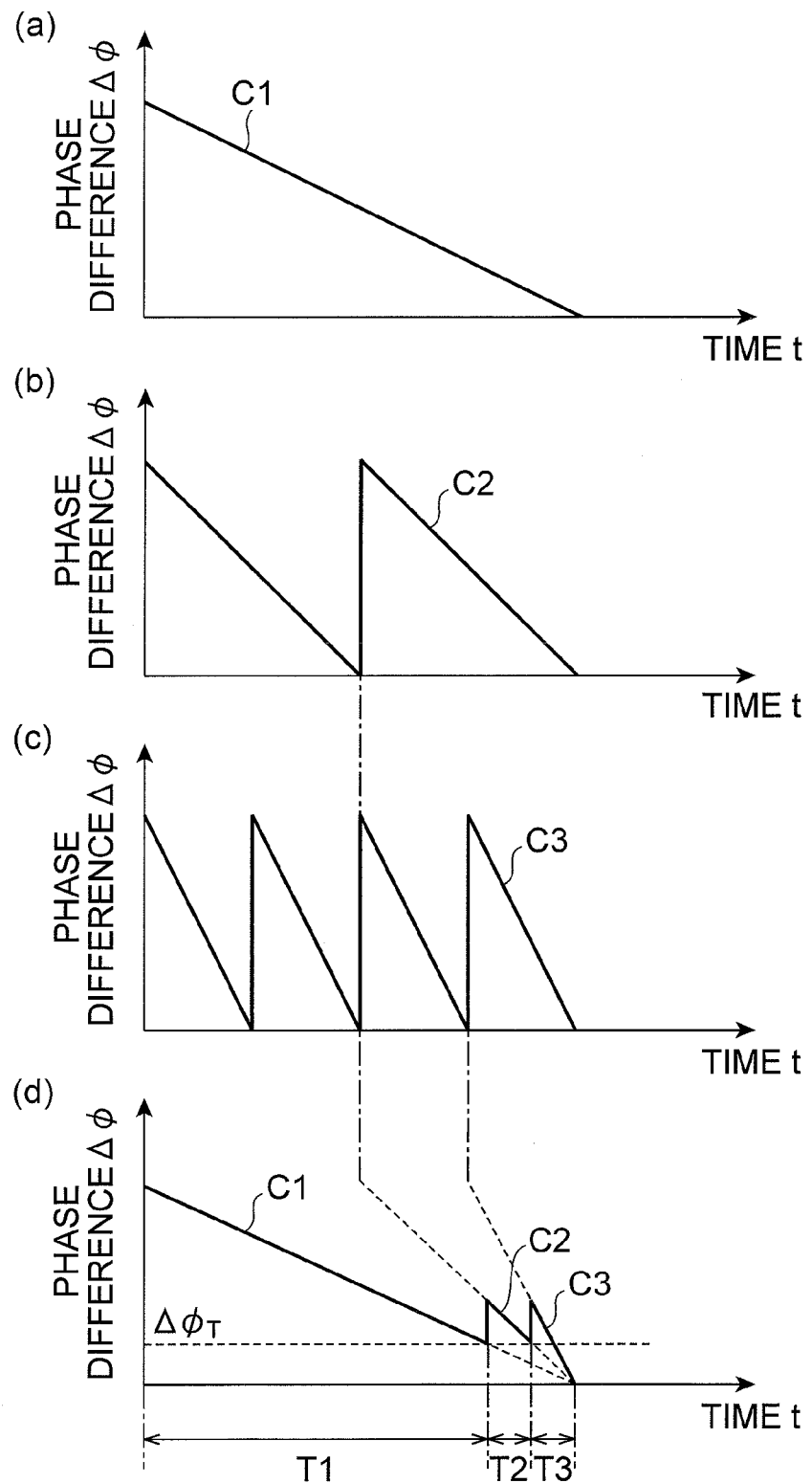
FIG. 12 includes graphs showing an example of a film thickness measurement method including wavelength switching.

FIG. 12 is a figure including graphs showing an example of a film thickness measurement method using wavelength switching. In this example, film thickness measurement is performed by using three kinds of different measurement conditions. Here, the refractive indexes of the semiconductor film 15 at the respective wavelengths are set constantly to 2.5. The first measurement condition is the first wavelength $\lambda_1$=600 nm, the second wavelength $\lambda_2$=638.3 nm, and the wavelength interval $\Delta\lambda$=38.3 nm. (a) in FIG. 12 shows a graph C1 of a temporal change in phase difference $\Delta\phi_{12}$ in this case, and the measurable film thickness range is 2000 nm.

The second measurement condition is the first wavelength $\lambda_1$=600 nm, the second wavelength $\lambda_2$=681.8 nm, and the wavelength interval $\Delta\lambda$=81.8 nm. (b) in FIG. 12 shows a graph C2 of a temporal change in phase difference in this case, and the measurable film thickness range is 1000 nm. The third measurement condition is the first wavelength $\lambda_1$=600 nm, the second wavelength $\lambda_2$=789.5 nm, and the wavelength interval $\Delta\lambda$=189.5 nm. (c) in FIG. 12 shows a graph C3 of a temporal change in phase difference in this case, and the measurable film thickness range is 500 nm.

(d) in FIG. 12 shows an example of a film thickness measurement method using wavelength switching when using these first to third measurement conditions. In this example, for a decrease in the film thickness d of the semiconductor film 15 due to the etching process, a measurement condition switching threshold $\Delta\phi_T$ is set, and at a time point at which the phase difference $\Delta\phi_{12}$ decreases to this threshold value, the measurement condition is switched. Specifically, in the measurement period T1 including the time of the measurement start of the film thickness d, the first measurement condition (C1) with the widest measurement range is applied.

Then, at a time point at which the phase difference reaches the threshold $\Delta\phi_T$, the measurement condition is switched to the second measurement condition (C2) with a resolution higher than that of the first measurement condition, and in the measurement period T2, the second measurement condition is applied. Further, at a time point at which the phase difference again reaches the threshold $\Delta\phi_T$, the measurement condition is switched to the third measurement condition (C3), and in the measurement period T3, the third measurement condition is applied. Thus, according to a film thickness decrease due to progress of etching, by performing switching so as to widen the wavelength interval $\Delta\lambda$ of the two wavelengths in a phased manner, the film thickness d of the semiconductor film 15 can be measured with extremely high accuracy. Here, in the above-described example, the wavelength interval is changed by fixing the wavelength $\lambda_1$ and changing the wavelength $\lambda_2$, however, it is also possible that the wavelength $\lambda_2$ is fixed and the wavelength $\lambda_1$ is changed. Alternatively, both wavelengths $\lambda_1$ and $\lambda_2$ may be changed.

Next, a specific example of analysis processing to be performed in the film thickness analysis section 40 of the film thickness measurement apparatus 1A shown in FIG. 3 will be described. FIG. 13 to FIG. 18 show graphs describing a specific example of analysis processing for film thickness measurement of a measuring object. Here, a method for calculating a phase in a temporal change in detected intensity of reflected interfering light of measurement light with one wavelength $\lambda$ will be described, however, analysis can be performed by the same method even when two wavelengths $\lambda_1$ and $\lambda_2$ are used.

Figure 13:
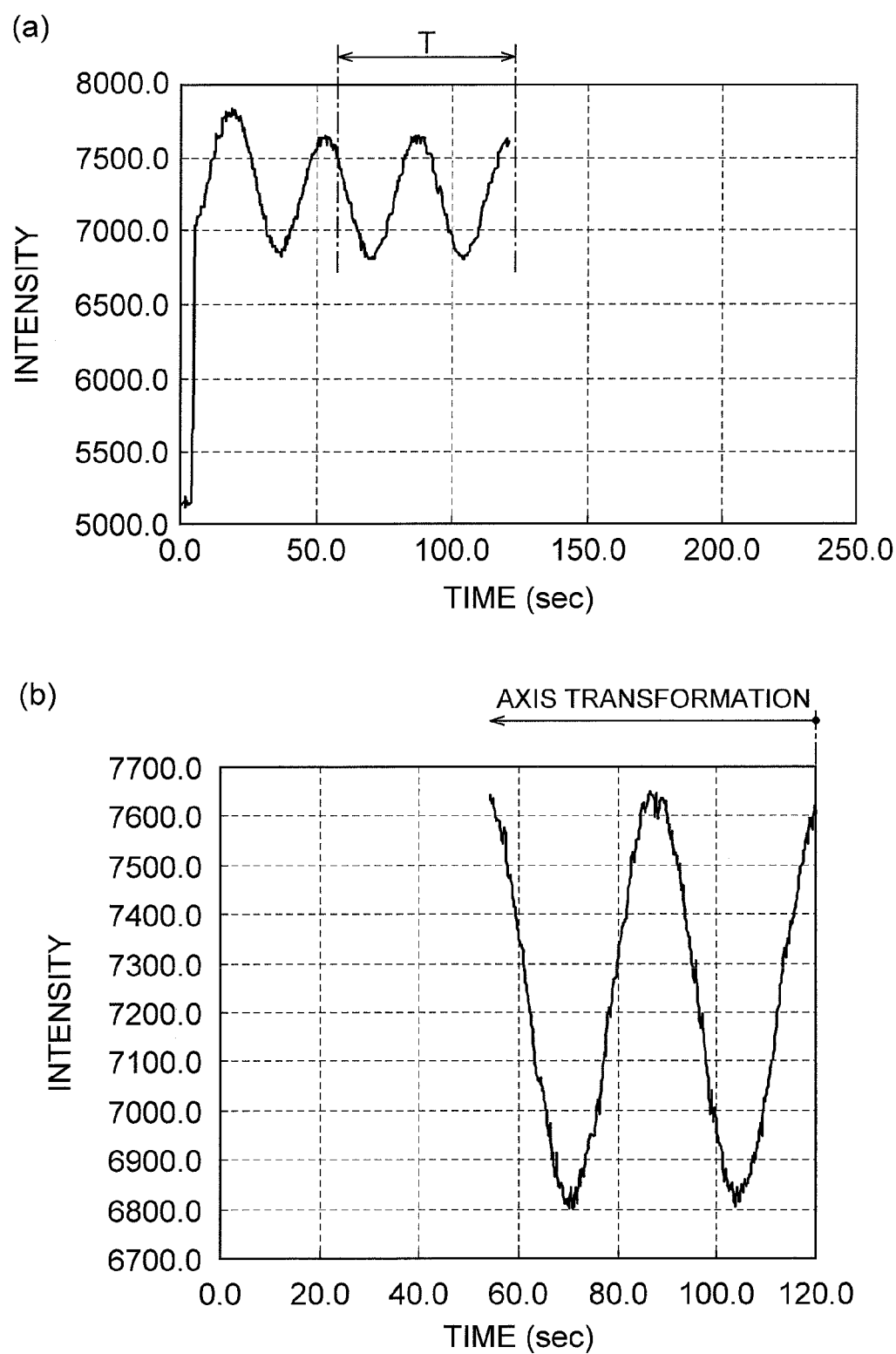
FIG. 13 includes graphs describing a specific example of analysis processing for film thickness measurement.

First, as shown in the graph (a) of FIG. 13, for data of a temporal change in detected intensity of reflected interfering light acquired for light with a wavelength $\lambda$, an analysis period T to be used for phase analysis (for example, a number of data to be used for phase analysis) is set. Axis transformation of measurement data in the clipped period T is performed by considering the wave advancing in a direction opposite to the time axis direction starting from the current time point as shown by the graph (b) of FIG. 13 and the graph (a) of FIG. 14.

Next, as shown by the graph (b) of FIG. 14, a temporal change that oscillates around zero is obtained by adjusting the offset so that the mean intensity becomes zero, and removing a 0-order component whose signal intensity is high in the detected intensity data. Further, as shown by the graph (a) of FIG. 15, in order to increase the frequency resolution in FFT analysis, the analysis period is extended. In this case, the detected intensity of the data extension portion in the detected intensity analysis data is preferably set to zero. Subsequently, as shown by the graph (b) of FIG. 15, a window function is applied to the detected intensity analysis data. This is for removing pseudo frequency signals caused by the finite data length. As the window function in this case, in detail, for example, a hamming window can be used. Alternatively, other window functions such as a Gauss window may also be used.

Figure 16:
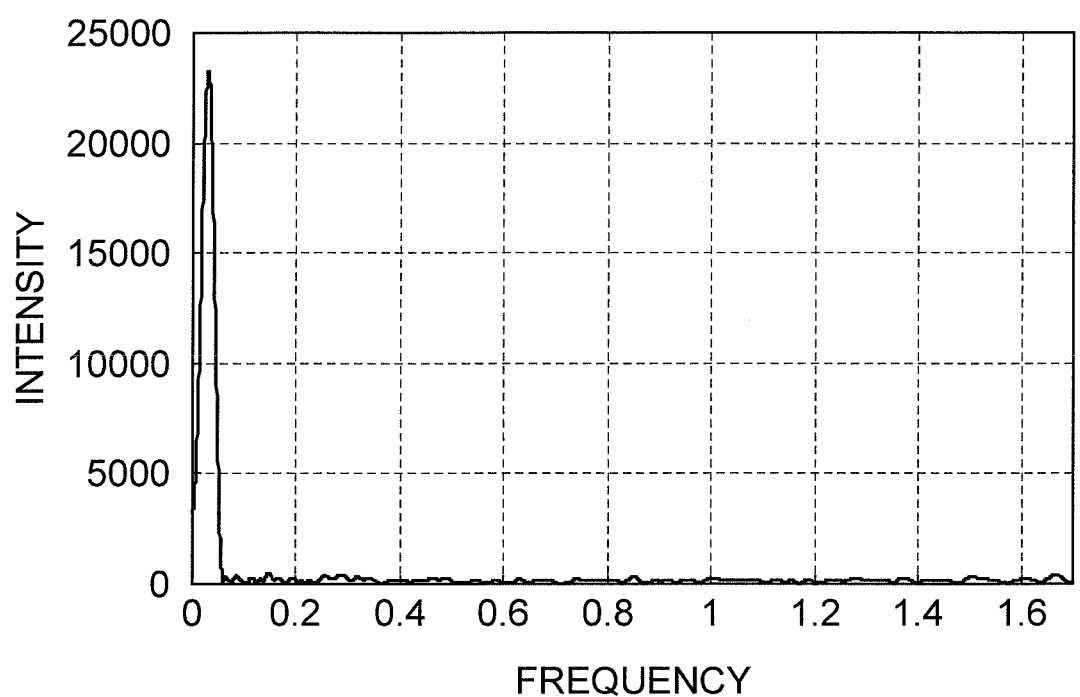
FIG. 16 is a graph describing a specific example of analysis processing for film thickness measurement.

To the detected intensity analysis data thus prepared, Fourier transform is applied by using a predetermined analysis method such as FFT analysis, and from the results of the Fourier transform, a phase $\phi$ in a temporal change in detected intensity is obtained. The results obtained by performing Fourier transform are shown in the graph of FIG. 16. Here, the phase is $\phi$=0. The phase mentioned herein means a delayed phase quantity with respect to a cosine wave with its origin at the current time point when a wave advancing in a direction opposite to the time axis direction is considered as described above. From the real part and the imaginary part of the intensity obtained by Fourier transform, the value of the phase can be obtained by atan(imaginary part/real part).

Figure 17:
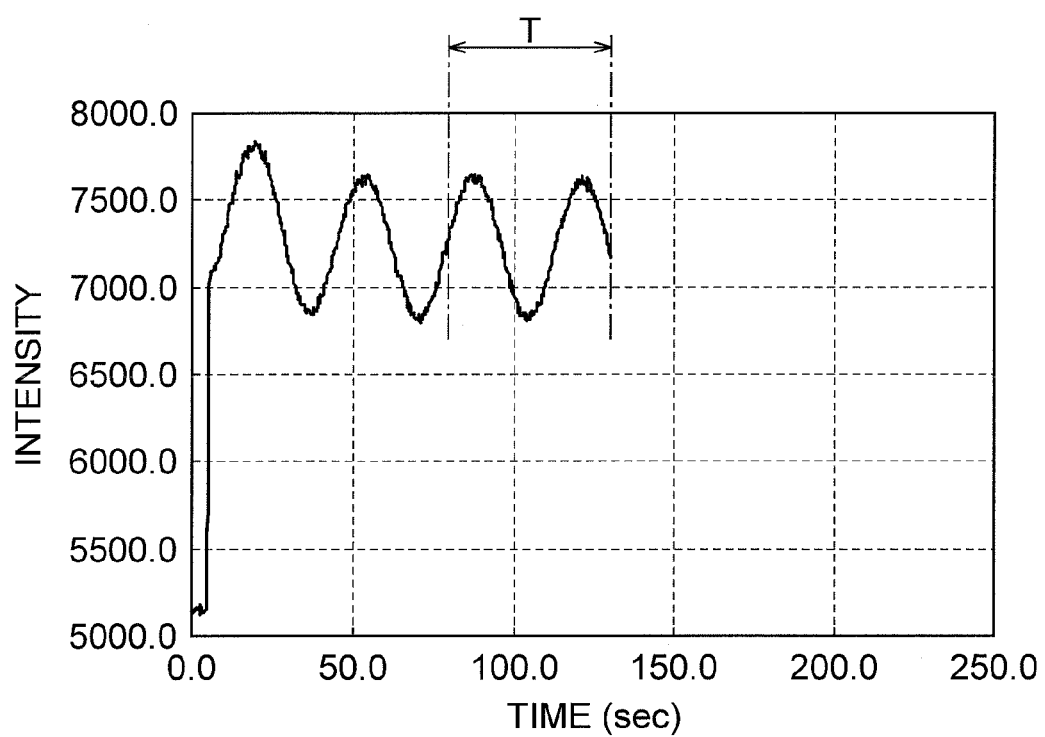
FIG. 17 is a graph describing a specific example of analysis processing for film thickness measurement.
Figure 18:
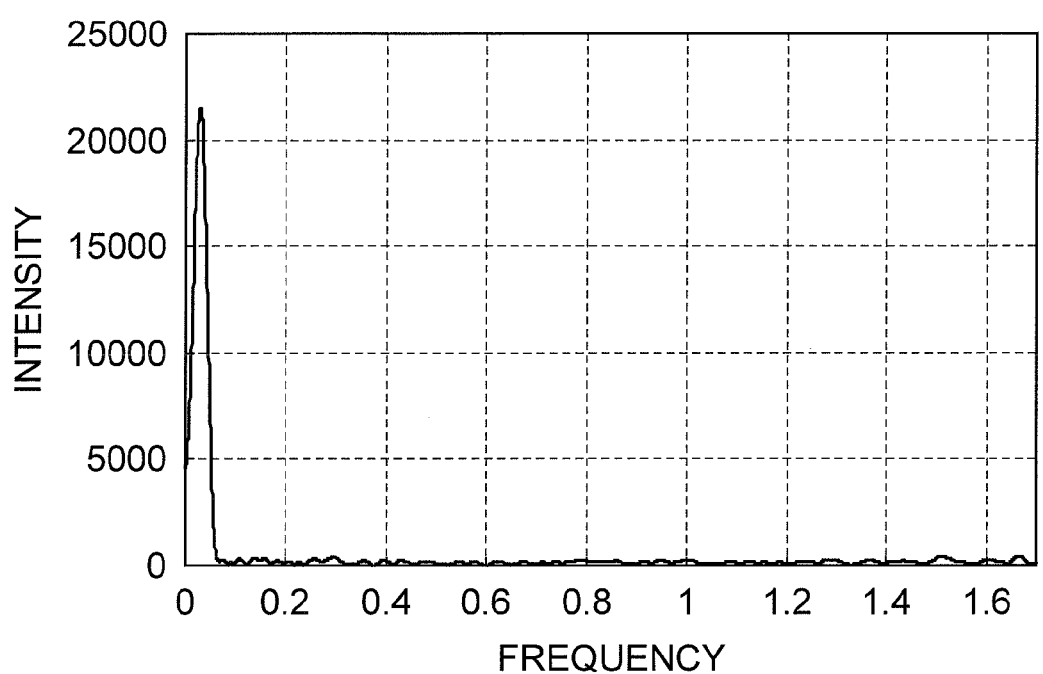
FIG. 18 is a graph describing a specific example of analysis processing for film thickness measurement.

For the analysis example shown in FIG. 13 to FIG. 16, an analysis example when the temporal change in detected intensity goes through a ¼ period is shown in FIG. 17 and FIG. 18. In the graph of FIG. 17, similar to the graph (a) of FIG. 13, an analysis period T to be used for phase analysis of the data of a temporal change in detected intensity of reflected interfering light is set. The results finally obtained by performing Fourier transform are shown in the graph of FIG. 18. The phase herein is obtained as $\phi=\pi/2$, and this proves that the temporal change in detected intensity goes through a ¼ period as described above.

In the film thickness measurement according to the above-described method, this phase analysis is applied respectively to the interfering light components of the first and second wavelengths $\lambda_1$ and $\lambda_2$, and based on a phase difference of these, a temporal change in absolute value of the film thickness d of the measuring object is obtained. For the temporal change of the film thickness d, a film thickness change rate, for example, etching rate or the like, can be obtained. When performing process control such as detection of an end point of etching, process control can be performed by a method in which the reference film thickness D set in advance and the measured film thickness d are compared or the corresponding reference phase difference ΔΦ and the measured phase difference $\Delta\phi_{12}$ are compared, and when these values match each other, a process end signal is outputted.

The film thickness measurement apparatus and the film thickness measurement method according to the present invention are not limited to the above-described embodiments and configuration examples, and can be variously modified. For example, FIG. 3 shows an example of the configuration of the measurement light source, the spectroscopic means, and the detection means to be used for film thickness measurement, and specifically, various configurations other than the above-described configuration may also be used. Further, the specific phase calculation method and film thickness analysis method, etc., for obtaining the film thickness d from the detected intensities of measured reflected interfering light are not limited to the above-described analysis examples, and specifically, various methods may be used.

The film thickness measurement apparatus according to the above-described embodiment measures a temporal change in film thickness of a film-like measuring object having a first surface and a second surface, and includes: (1) a measurement light source that supplies measurement light containing at least a first measurement light component with a first wavelength and a second measurement light component with a second wavelength different from the first wavelength to the measuring object, (2) spectroscopic means that decomposes interfering light generated by interference of reflected light from the first surface and reflected light from the second surface of the measuring object of the measurement light into a first interfering light component with the first wavelength and a second interfering light component with the second wavelength so as to be detectable separately, (3) detection means that detects intensities of the first interfering light component and the second interfering light component respectively at each timing, and (4) film thickness analysis means that obtains a temporal change in film thickness of the measuring object based on a phase difference between a first phase in a temporal change in detected intensity of the first interfering light component and a second phase in a temporal change in detected intensity of the second interfering light component.

Similarly, the film thickness measurement method according to the above-described embodiment is for measuring a temporal change in film thickness of a film-like measuring object having a first surface and a second surface, and includes: (1) a measurement light supply step of supplying measurement light containing at least a first measurement light component with a first wavelength and a second measurement light component with a second wavelength different from the first wavelength to the measuring object from a measurement light source, (2) a spectroscopic step of decomposing interfering light generated by interference of reflected light from the first surface and reflected light from the second surface of the measuring object of the measurement light into a first interfering light component with the first wavelength and a second interfering light component with the second wavelength so as to be detectable separately, (3) a detection step of detecting intensities of the first interfering light component and the second interfering light component respectively at each timing, and (4) a film thickness analysis step of obtaining a temporal change in film thickness of the measuring object based on a phase difference between a first phase in a temporal change in detected intensity of the first interfering light component and a second phase in a temporal change in detected intensity of the second interfering light component.

Here, a specific measuring object whose temporal change in film thickness is to be measured in the above-described measurement may be a semiconductor film on a substrate, and the temporal change in film thickness of the semiconductor film is preferably measured during execution of a predetermined process. With this configuration, as described above, during execution of a semiconductor process such as etching or thin-film formation, a temporal change in absolute value of the film thickness can be measured, and process control such as detection of an end point of the process can be accurately performed.

In the measurement apparatus, the measurement light source may be configured to be capable of supplying three or more measurement light components with wavelengths different from each other as components of the measurement light, and the spectroscopic means and the detection means may be configured to be capable of changing the first wavelength and the second wavelength to be used for measurement of the temporal change in film thickness. Similarly, in the measurement method, it is possible that the measurement light source is configured to be capable of supplying three or more measurement light components with wavelengths different from each other as components of the measurement light, and in the spectroscopic step and the detection step, the first wavelength and the second wavelength to be used for measurement of the temporal change in film thickness are changed. Accordingly, the measurement conditions can be preferably set and changed according to the state of a temporal change in film thickness.

In the configuration in which the first wavelength and the second wavelength are changed as described above, when measuring the temporal change in which the film thickness of the measuring object decreases, it is preferable that the first wavelength and the second wavelength are changed so that the wavelength interval between the two wavelengths is widened in a phased manner. An example of this measurement is measurement of a temporal change in film thickness of a semiconductor film on a substrate during execution of an etching process.

As a specific configuration of the measurement apparatus, a configuration in which the measurement light source is a white light source that supplies white light with a wavelength region including the first wavelength and the second wavelength as the measurement light can be used. The spectroscopic means may be configured to include a spectroscopic optical system that decomposes the interfering light into interfering light components with the respective wavelengths, and the detection means may be configured to include a multi-channel photodetector including a plurality of photo-detection elements aligned for detecting intensities of the respective interfering light components decomposed by the spectroscopic optical system. Various configurations other than those described can also be used for the measurement light source, the spectroscopic means, and the detection means.

Industrial Applicability

The present invention is applicable as a film thickness measurement apparatus and a film thickness measurement method by which a temporal change in film thickness of a film-shaped measuring object can be accurately measured.

REFERENCE SIGNS LIST

1A—film thickness measurement apparatus, 10—sample, 12—substrate, 15—semiconductor film (measuring object), 16—upper surface (first surface), 17—lower surface (second surface), 20—processing unit, 21—measurement optical system, 22—XYθ stage, 23—stage control section, 24—imaging device, 25—measurement position setting section, 28—measurement light source, 30—spectroscopic optical system, 31—first photodetector, 32—second photodetector, 33—multi-channel photodetector, 35—spectroscopic measurement device, 40—film thickness analysis section, 41—phase analysis section, 42—measured phase difference acquiring section, 43—reference film thickness storage section, 44—reference phase difference acquiring section, 45—phase difference information processing section, 46—film thickness information output section, 47—end point information output section, 50—measurement control section, 51—input device, 52—display device.

The invention claimed is:

1. A film thickness measurement apparatus for measuring a temporal change in film thickness of a film-shaped measuring object having a first surface and a second surface, comprising:
   a measurement light source supplying measurement light containing at least a first measurement light component with a first wavelength and a second measurement light component with a second wavelength different from the first wavelength to the measuring object;
   spectroscopic means decomposing interfering light generated by interference of reflected light from the first surface and reflected light from the second surface of the measuring object of the measurement light into a first interfering light component with the first wavelength and a second interfering light component with the second wavelength;
   detection means detecting intensities of the first interfering light component and the second interfering light component respectively at each time point; and
   film thickness analysis means obtaining a first phase at a measurement time point in a temporal change in detected intensity of the first interfering light component and a second phase at the same measurement time point in a temporal change in detected intensity of the second interfering light component, and obtaining a film thickness of the measuring object at the measurement time point based on a phase difference between the first phase and the second phase.

2. The film thickness measurement apparatus according to claim 1, wherein the measuring object is a semiconductor film on a substrate, and the temporal change in film thickness of the semiconductor film during execution of a predetermined process is measured.

3. The film thickness measurement apparatus according to claim 1, wherein the measurement light source is configured to be capable of supplying three or more measurement light components with wavelengths different from each other as components of the measurement light, and the spectroscopic means and the detection means are configured to be capable of changing the first wavelength and the second wavelength to be used for measurement of the temporal change in film thickness.

4. The film thickness measurement apparatus according to claim 3, wherein when measuring the temporal change in which the film thickness of the measuring object decreases, the first wavelength and the second wavelength are changed so that the wavelength interval between the two wavelengths is widened in a phased manner.

5. The film thickness measurement apparatus according to claim 1, wherein the measurement light source is a white light source that supplies white light with a wavelength region including the first wavelength and the second wavelength as the measurement light.

6. The film thickness measurement apparatus according to claim 1, wherein the spectroscopic means includes a spectroscopic optical system that decomposes the interfering light into interfering light components with the respective wavelengths, and
the detection means includes a multi-channel photodetector including a plurality of photodetection elements aligned for detecting intensities of the interfering light components decomposed by the spectroscopic optical system.

7. The film thickness measurement apparatus according to claim 1, wherein the wavelength interval between the first wavelength and the second wavelength is adjusted based on the film thickness of the measuring object.

8. A film thickness measurement method for measuring a temporal change in film thickness of a film-shaped measuring object having a first surface and a second surface, comprising:
   a measurement light supply step of supplying measurement light containing at least a first measurement light component with a first wavelength and a second measurement light component with a second wavelength different from the first wavelength to the measuring object from a measurement light source;
   a spectroscopic step of decomposing interfering light generated by interference of reflected light from the first surface and reflected light from the second surface of the measuring object of the measurement light into a first interfering light component with the first wavelength and a second interfering light component with the second wavelength;
   a detection step of detecting intensities of the first interfering light component and the second interfering light component respectively at each time point; and
   a film thickness analysis step of obtaining a first phase at a measurement time point in a temporal change in detected intensity of the first interfering light component and a second phase at the same measurement time point in a temporal change in detected intensity of the second interfering light component, and obtaining a film thickness of the measuring object at the measurement time point based on a phase difference between the first phase and the second phase.

9. The film thickness measurement method according to claim 8, wherein the measuring object is a semiconductor film on a substrate, and the temporal change in film thickness of the semiconductor film during execution of a predetermined process is measured.

10. The film thickness measurement method according to claim 8, wherein the measurement light source is configured to be capable of supplying three or more measurement light components with wavelengths different from each other as components of the measurement light, and in the spectroscopic step and the detection step, the first wavelength and the second wavelength to be used for measurement of the temporal change in film thickness are changed.

11. The film thickness measurement method according to claim 10, wherein when measuring the temporal change in which the film thickness of the measuring object decreases, the first wavelength and the second wavelength are changed so that the wavelength interval between the two wavelengths is widened in a phased manner.

12. The film thickness measurement method according to claim 8, wherein the wavelength interval between the first wavelength and the second wavelength is adjusted based on the film thickness of the measuring object.

* * * * *